(12) United States Patent
Maki et al.

(10) Patent No.: US 12,074,707 B2
(45) Date of Patent: Aug. 27, 2024

(54) MOBILE STATION, BASE STATION, RECEPTION METHOD, AND TRANSMISSION METHOD

(71) Applicant: Panasonic Intellectual Property Corporation of America, Torrance, CA (US)

(72) Inventors: Shotaro Maki, Kanagawa (JP); Akihiko Nishio, Osaka (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/918,534

(22) PCT Filed: Feb. 18, 2021

(86) PCT No.: PCT/JP2021/006140
§ 371 (c)(1),
(2) Date: Oct. 12, 2022

(87) PCT Pub. No.: WO2021/210264
PCT Pub. Date: Oct. 21, 2021

(65) Prior Publication Data
US 2023/0147138 A1  May 11, 2023

(30) Foreign Application Priority Data
Apr. 17, 2020 (JP) ................ 2020-074118

(51) Int. Cl.
*H04L 1/08* (2006.01)
*H04L 5/00* (2006.01)
(Continued)

(52) U.S. Cl.
CPC .............. *H04L 1/08* (2013.01); *H04L 5/0055* (2013.01); *H04W 52/02* (2013.01); *H04W 72/0446* (2013.01)

(58) Field of Classification Search
CPC ........ H04L 1/08; H04L 5/0055; H04W 52/02; H04W 72/0446
See application file for complete search history.

(56) References Cited

U.S. PATENT DOCUMENTS

| | | | |
|---|---|---|---|
| 11,251,849 B2* | 2/2022 | Park ...................... | H04B 7/0456 |
| 2014/0211717 A1* | 7/2014 | Jitsukawa ............. | H04L 5/0039 370/329 |

(Continued)

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

(Continued)

*Primary Examiner* — Samir W Rizk
(74) *Attorney, Agent, or Firm* — Seed IP Law Group LLP

(57) ABSTRACT

This mobile station is provided with a control circuit that, on the basis of information relating to a plurality of second time resources including a first time resource set to a first type of mobile station, decides a resource used for repeat transmission to a second type of mobile station, and a reception circuit that receives signals by a resource.

14 Claims, 23 Drawing Sheets

(51) Int. Cl.
*H04W 52/02* (2009.01)
*H04W 72/0446* (2023.01)

(56) References Cited

U.S. PATENT DOCUMENTS

| | | | |
|---|---|---|---|
| 2021/0258898 A1* | 8/2021 | Ma | H04B 7/068 |
| 2021/0266109 A1* | 8/2021 | Shrestha | H04L 5/0055 |
| 2022/0038240 A1* | 2/2022 | Ma | H04L 5/0094 |

OTHER PUBLICATIONS

3GPP, "3rd Generation Partnership Project; Technical Specification Group Radio Access Network; NR; Physical channels and modulation (Release 15)," 3GPP TS 38.211 V15.6.0, Jun. 2019. (97 pages).
3GPP, "3rd Generation Partnership Project; Technical Specification Group Radio Access Network; NR; Physical layer procedures for control (Release 16)," 3GPP TS 38.213 V16.1.0, Mar. 2020. (156 pages).
3GPP, "3rd Generation Partnership Project; Technical Specification Group Radio Access Network; NR; User Equipment (UE) radio transmission and reception; Part 1: Range 1 Standalone (Release 16)," 3GPP TS 38.101-1 V16.3.0, Mar. 2020. (332 pages).
3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).
3GPP, "3rd Generation Partnership Project; Technical Specification Group Services and System Aspects; System Architecture for the 5G System; Stage 2 (Release 16)," 3GPP TS 23.501 V16.1.0, Jun. 2019. (367 pages).
Ericsson, "New SID on support of reduced capability NR devices," RP-193238, Agenda Item: 9.1.1, 3GPP TSG RAN Meeting #86, Sitges, Spain, Dec. 9-12, 2019. (5 pages).
Ericsson, "Summary of email discussion on NR-Light," RP-192160, Agenda Item: 8.2.1, 3GPP TSG RAN Meeting #85, Newport Beach, US, Sep. 16-19, 2019. (20 pages).
International Search Report, mailed Apr. 27, 2021, for International Patent Application No. PCT/JP2021/006140. (3 pages).
International Telecommunication Union (ITU), "IMT Vision—Framework and overall objectives of the future development of IMT for 2020 and beyond," Radiocommunication Sector of the ITU (ITU-R), M.2083-0, Geneva, Sep. 2015. (21 pages).
MediaTek Inc., "Remaining issues on PDCCH-based power saving signal," R1-2001843, Agenda Item: 7.2.7.1, 3GPP TSG RAN WG1 #100bis, e-Meeting, Apr. 20-30, 2020. (4 pages).
NTT Docomo, Inc., "Revised WID on New Radio Access Technology," RP-181726, Agenda Item: 9.2.1, 3GPP TSG RAN Meeting #81, Gold Coast, Australia, Sep. 10-13, 2018. (12 pages).
Spreadtrum Communications, "Discussion on DRS in NR-U," R1-1912571, Agenda Item: 7.2.2.1.1, 3GPP TSG RAN WGI Meeting #99, Reno, USA, Nov. 18-22, 2019. (15 pages).

* cited by examiner

| Index | SS/PBCH block and CORESET multiplexing pattern | Number of RBs | Number of Symbols | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| ... | ... | ... | ... | ... |

Table for CORESET for type0-PDCCH

FIG. 3A

| Index | O | Number of search space sets per slot | M | First symbol index |
|---|---|---|---|---|
| 0 | 0 | 1 | 1 | 0 |
| 1 | 0 | 2 | 1/2 | $\{0, \text{if } i \text{ is even}\}, \{N_{symb}^{CORESET}, \text{if } i \text{ is odd}\}$ |
| 2 | 2 | 1 | 1 | 0 |
| ... | ... | ... | ... | ... |

Table for search space (monitoring occation) for type0-PDCCH

FIG. 3B

Table for CORESET for type0-PDCCH

| Index | SS/PBCH block and CORESET multiplexing pattern | Number of RBs | Number of Symbols | Offset (RBs) | Repetition for UE type A |
|---|---|---|---|---|---|
| 0 | 1 | 24 | 2 | 0 | No Repetition |
| 1 | 1 | 24 | 2 | 2 | |
| 2 | 1 | 24 | 2 | 4 | |
| 3 | 1 | 24 | 3 | 0 | |
| 4 | 1 | 24 | 3 | 2 | |
| 5 | 1 | 24 | 3 | 4 | |
| 6 | 1 | 48 | 1 | 12 | Repetition during SFN (0-9) and during SFN (10-19) |
| 7 | 1 | 48 | 1 | 16 | |
| 8 | 1 | 48 | 2 | 12 | |
| 9 | 1 | 48 | 2 | 16 | |
| 10 | 1 | 48 | 3 | 12 | |
| 11 | 1 | 48 | 3 | 16 | |
| 12 | 1 | 96 | 1 | 38 | |
| 13 | 1 | 96 | 2 | 38 | |
| 14 | 1 | 96 | 3 | 38 | |
| 15 | Reserved | | | | |

FIG. 18

Table for search space (monitoring occasion) for type0–PDCCH

| Index | O | Number of search space sets per slot | M | First symbol index | Repetition for UE type A |
|---|---|---|---|---|---|
| 0 | 0 | 1 | 1 | 0 | No repetition |
| 1 | 0 | 2 | 1/2 | $\{0, \text{ if } i \text{ is even}\}, \{N_{symb}^{CORESET}, \text{ if } i \text{ is odd}\}$ | Repetition during SFN (0-9) and during SFN (10-19) |
| 2 | 2 | 1 | 1 | 0 | No repetition |
| 3 | 2 | 2 | 1/2 | $\{0, \text{ if } i \text{ is even}\}, \{N_{symb}^{CORESET}, \text{ if } i \text{ is odd}\}$ | Repetition during SFN (0-9) and during SFN (10-19) |
| 4 | 5 | 1 | 1 | 0 | No repetition |
| 5 | 5 | 2 | 1/2 | $\{0, \text{ if } i \text{ is even}\}, \{N_{symb}^{CORESET}, \text{ if } i \text{ is odd}\}$ | Repetition during SFN (0-9) and during SFN (10-19) |
| 6 | 7 | 1 | 1 | 0 | No repetition |
| 7 | 7 | 2 | 1/2 | $\{0, \text{ if } i \text{ is even}\}, \{N_{symb}^{CORESET}, \text{ if } i \text{ is odd}\}$ | Repetition during SFN (0-9) and during SFN (10-19) |
| 8 | 0 | 1 | 2 | 0 | No repetition |
| 9 | 5 | 1 | 2 | 0 | |
| 10 | 0 | 1 | 1 | 1 | |
| 11 | 0 | 1 | 1 | 2 | |
| 12 | 2 | 1 | 1 | 1 | |
| 13 | 2 | 1 | 1 | 2 | |
| 14 | 5 | 1 | 1 | 1 | |
| 15 | 5 | 1 | 1 | 2 | |

FIG. 19

MOBILE STATION, BASE STATION, RECEPTION METHOD, AND TRANSMISSION METHOD

TECHNICAL FIELD

The present disclosure relates to a mobile station, abase station, a reception method, and a transmission method.

BACKGROUND ART

A communication system called the 5th generation mobile communication system (5G) has been studied. The 3rd Generation Partnership Project (3GPP), an international standards-developing organization, has been studying development of the 5G communication system in terms of both the development of LTE/LTE-Advanced systems and a New Radio Access Technology (also referred to as New RAT or NR), which is a new method not necessarily backward compatible with the LTE/LTE-Advanced systems (see, for example, Non Patent Literature (hereinafter referred to as "NPL") 1).

CITATION LIST

Non Patent Literature

NPL 1

RP-181726, "Revised WID on New Radio Access Technology", NTT DOCOMO, September 2018

NPL 2

RP-193238, "New SID on Support of Reduced Capability NR Devices", Ericsson, December 2019

NPL 3

3GPP TS 38.213 V16.1.0, "NR Physical layer procedure for control (Release 16)", 2020-03

NPL 4

3GPP TS 38.101-1 V16.3.0, "NR; User Equipment (UE) radio transmission and reception; Part 1: Range 1 Standalone (Release 16)", 2020-03

SUMMARY OF INVENTION

There is scope for further study, however, on a method for improving received quality of a downlink signal in a mobile station.

One non-limiting and exemplary embodiment facilitates providing a mobile station, a base station, a reception method, and a transmission method each capable of improving received quality of a downlink signal in a mobile station.

A mobile station according to an embodiment of the present disclosure includes: control circuitry, which, in operation, determines a resource based on information on a plurality of second time resources including a first time resource configured for a first type mobile station, the resource being used for repetition to a second type mobile station; and reception circuitry, which, in operation, receives a signal in the resource.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve received quality of a downlink signal in a mobile station.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 3A is a block diagram illustrating an exemplary parameter included in a master information block (MIB);

FIG. 3B is a block diagram illustrating another exemplary parameter included in the MIB;

FIG. 18 is a block diagram illustrating exemplary parameters included in the MIB;

FIG. 19 is a block diagram illustrating other exemplary parameters included in the MIB;

DESCRIPTION OF EMBODIMENTS

Hereinafter, embodiments of the present disclosure will be described in detail with reference to the accompanying drawings.

[Reduced Capability NR Devices]

In Release 17 (hereinafter, referred to as Rel-17 NR), for example, a specification is expected to be developed to enable a mobile station (e.g., also referred to as an NR terminal) that supports a variety of use cases while reducing power consumption or cost by limiting some functions or capabilities compared to a mobile station (e.g., also referred to as a terminal or user equipment (UE)) supporting Release 15 or 16 (hereinafter, referred to as Rel-15/16 NR). Note that such a mobile station is sometimes referred to as a reduced capability NR device. RedCap, RedCap mobile station, NR-Lite, or NR-Light, for example.

[Processing for Mobile Station to Receive Type0-PDCCH]

Figure 1:
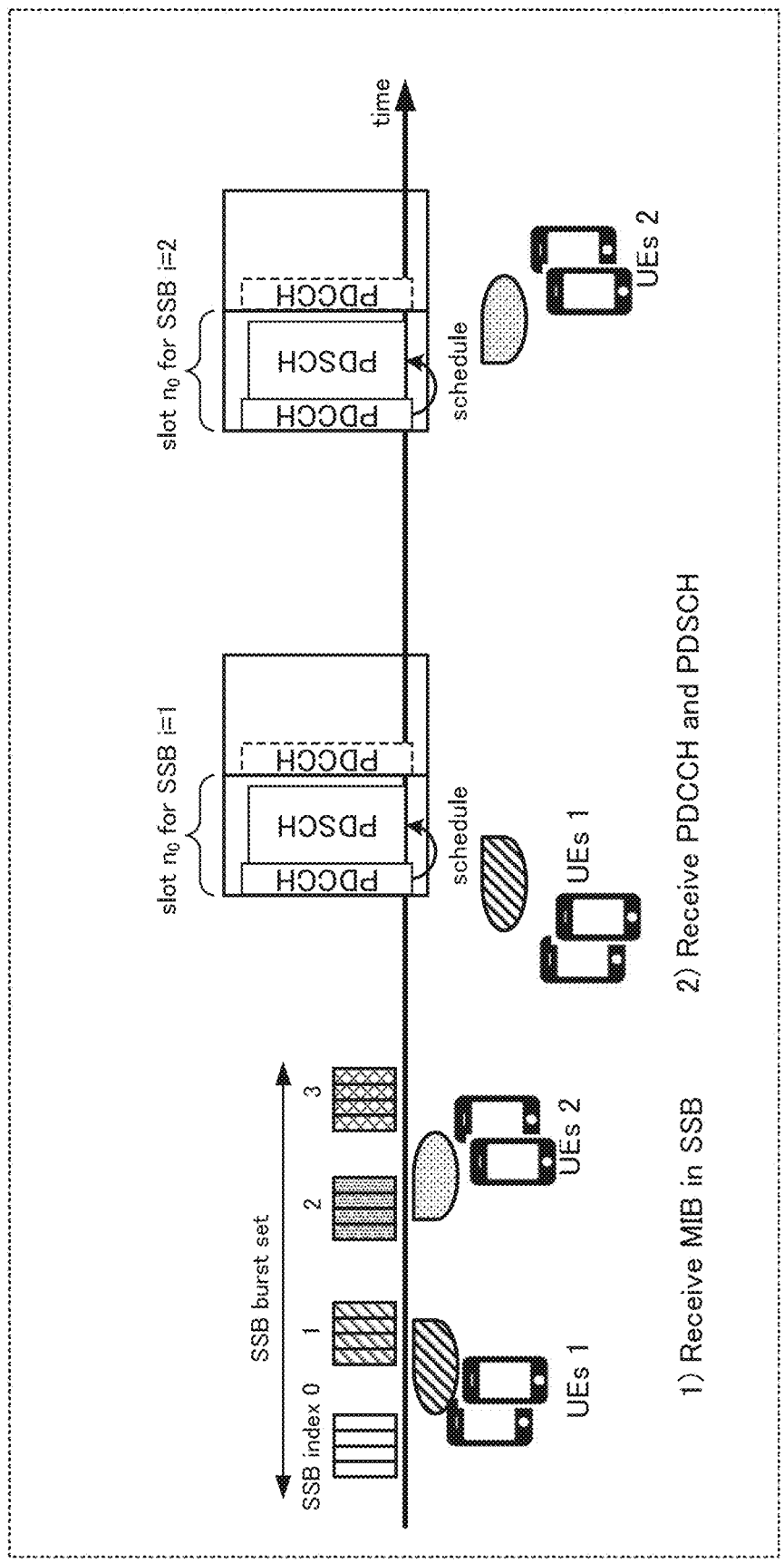
FIG. 1 illustrates an exemplary procedure for receiving a type0-physical downlink control channel (type0-PDCCH)

FIG. 1 illustrates an exemplary procedure for a mobile station to receive a type0-physical downlink control channel (type0-PDCCH), which is one of downlink signals shared with a plurality of mobile stations (referred to as a "downlink shared signal", for example).

The type0-PDCCH is a signal that a mobile station (e.g., mobile station in RRC_IDLE mode) not being connected to a cell (e.g., also referred to as a base station or gNB) can receive in order to acquire cell information, for example. As illustrated in FIG. 1, for example, the mobile station in the RRC_IDLE mode (e.g., UEs 1 and UEs 2) may 1) receive information of a master information block (MIB) carried by a synchronization signal (SS)/physical broadcast channel (PBCH) block (SSB), 2) receive a type0-PDCCH (PDCCH in FIG. 1), and receive a PDSCH (e.g., including a system information block (SIB)) scheduled by the received PDCCH (see, for example, NPL 3).

For example, the base station can transmit a plurality of SSBs per time unit. The plurality of SSBs are collectively referred to as an "SSB burst set", for example. For example, different SSB indices (SSB index=1 to 3 in FIG. 1) may be respectively configured for the SSBs transmitted at different times, and the SSBs may be transmitted by different beams respectively. The mobile station may select a single index of the SSB with high reception level (i.e., received quality), which may be represented by SSB index i, among indices of the detected SSBs, for example. Such a procedure is sometimes referred to as "beam sweeping", for example.

Figure 2:
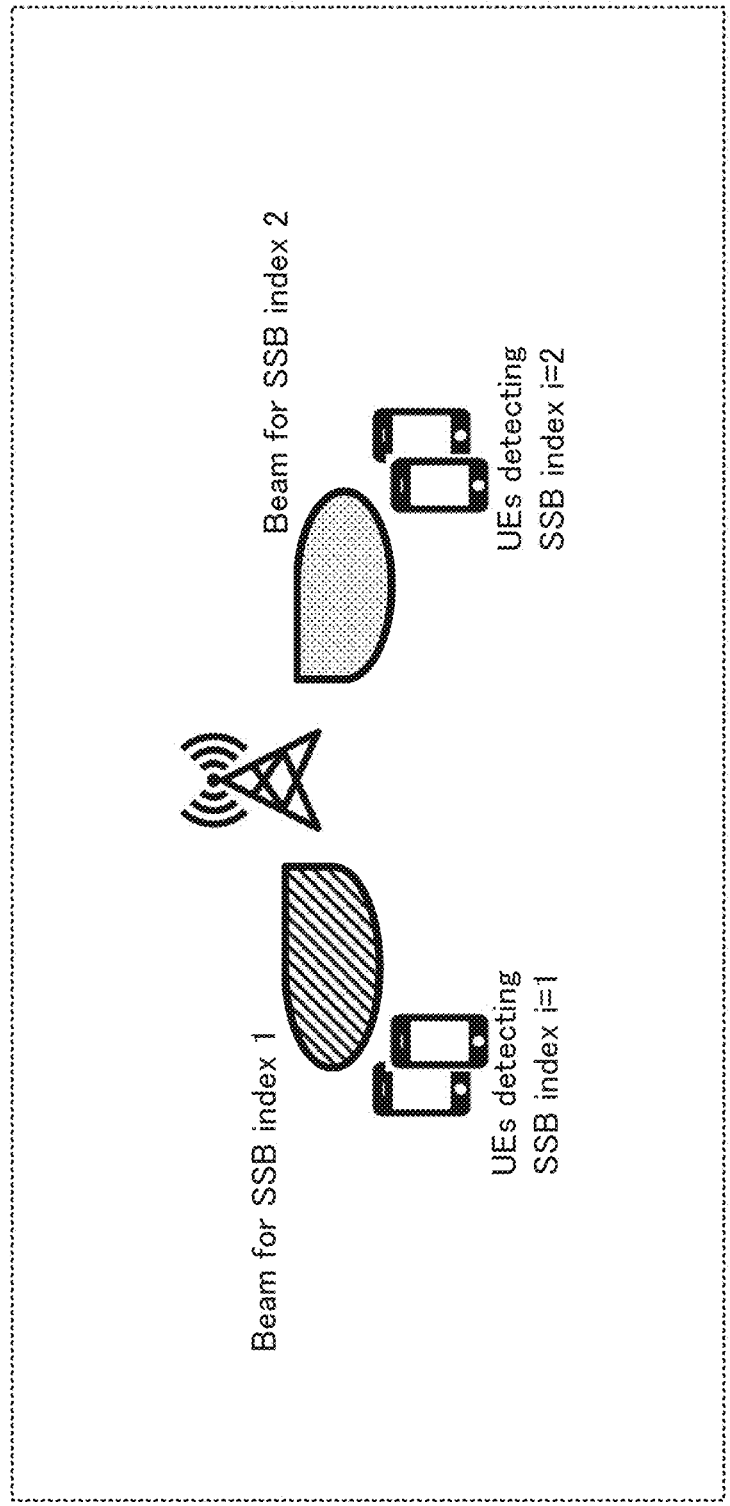
FIG. 2 illustrates exemplary beam sweeping.

FIG. 2 illustrates exemplary beam sweeping. In FIG. 2, the reception level of SSB index 1 is higher than that of another SSB at one or more mobile stations on the left side, for example, and thus i=1 may be selected. Likewise, in FIG. 2, the reception level of SSB index 2 is higher than that of another SSB at one or more mobile stations on the right side, for example, and thus i=2 may be selected.

The MIB carried by the PBCH composing the SSB may include a parameter on the PDCCH such as "controlResourceSetZero" and "searchSpaceZero".

The controlResourceSetZero may transmit (or indicate), for example, an "index" of information on a control resource set (CORESET) for the type0-PDCCH illustrated in FIG. 3A (e.g., table for CORESET for type0-PDCCH). The mobile station may specify the CORESET for type0-PDCCH based on the controlResourceSetZero included in the MIB, for example.

The searchSpaceZero may transmit (or indicate), for example, an "index" of information on search space (or monitoring occasions) for the type0-PDCCH illustrated in FIG. 3B (e.g., table for search space (monitoring occasion) for type0-PDCCH). The mobile station may specify the search space for type0-PDCCH based on the searchSpaceZero included in the MIB, for example.

For example, when the "SS/PBCH block and CORESET multiplexing pattern" configured by the controlResourceSetZero is 1, the mobile station may monitor the type0-PDCCH mapped to slot $n_0$ or slot $n_0+1$. For example, when the SS/PBCH block and CORESET multiplexing pattern is 2 or 3, the mobile station may monitor the type0-PDCCH mapped to slot $n_0$. Note that the slot number $n_0$ may be calculated, for example, based on the following Expression 1:

$$n_o = (O \cdot 2^\mu + \lfloor i \cdot M \rfloor) \bmod N_{slot}^{frame,\mu} \quad \text{(Expression 1)}.$$

In Expression 1, "M" and "O" are values configured by the searchSpaceZero, "i" represents an SSB index selected by the beam sweeping described above, "$N_{slot}^{frame,\mu}$" represents the number of slots per radio frame, and "$\mu$" is a parameter called numerology. These parameters may be common values among the mobile stations, for example.

The mobile station may specify (i.e., recognize) a physical resource of the PDSCH scheduled by downlink control information (DCI) carried by the received type0-PDCCH, for example. The mobile station may then receive an SIB on the PDSCH, for example.

Through the above procedure, a group of mobile stations that have selected the same SSB index i by the beam sweeping monitors slot $n_0$ (and slot $n_0+1$) calculated from i, and can receive a shared type0-PDCCH and a shared PDSCH scheduled by the type0-PDCCH.

[Number of Antennas Mounted on Mobile Station]

For example, a mobile station that supports Rel-15/16 (hereinafter also referred to as a Rel-15/16 mobile station) is expected to support at least two reception antenna ports (or at least four reception antenna ports depending on the band to use) (see, for example, NPL 4). Thus, at least two (four depending on the band to use) reception antennas are expected to be mounted on the Rel-15/16 mobile station.

Meanwhile, studies have been conducted on reducing the number of reception antennas mounted on a RedCap mobile station, as compared to the Rel-15/16 mobile station, for cost reduction or to mount the antennas on a small apparatus, for example (e.g., see NPL 2).

For example, the Rel-15/16 mobile station is capable of combined reception between antennas using a plurality of antennas or an amplifier. The combined reception improves reception accuracy of a downlink signal even at a mobile station away from a base station, for example. A mobile station with more antennas can receive a downlink signal over a longer distance (e.g., distance between the base station and the mobile station). In other words, the more antennas a mobile station has, the wider the coverage is.

Meanwhile, a mobile station with a small number of reception antennas compared to the Rel-15/16 mobile station, such as the RedCap mobile station, tends to have less effect of the combined reception between antennas, and the distance over which the mobile station can receive a downlink signal tends to be shorter. In other words, the RedCap mobile station is likely to have a narrow coverage compared to the Rel-15/16 mobile station.

In an embodiment of the present disclosure, for example, a description will be given of a method for expanding the coverage of a mobile station with a small number of reception antennas such as the RedCap mobile station.

Note that the type0-PDCCH and the PDSCH scheduled by the type0-PDCCH may be commonly received among a plurality of mobile stations including the Rel-15/16 mobile station and the RedCap mobile station, for example. Thus, in a case of changing a transmission and reception scheme for a signal such as the type0-PDCCH or the PDSCH (hereinafter, also referred to as a "shared downlink signal" or "shared downlink channel") to expand the coverage of the RedCap mobile station, no engineering change is expected to be made to a base station supporting Rel-15/16 (hereinafter, also referred to as a Rel-15/16 base station) or the Rel-15/16 mobile station.

An embodiment of the present disclosure enables the RedCap mobile station to, for example, receive a shared downlink signal in coverage equivalent to that of a mobile station the type of which is different from the RedCap mobile station (e.g., Rel-15/16 mobile station). In addition, according to an embodiment of the present disclosure, the coverage of the RedCap mobile station can be expanded without changing a method of receiving a shared downlink signal in a mobile station the type of which is different from the RedCap mobile station, for example.

Embodiment 1

[Overview of Communication System]

A communication system according to the present embodiment includes base station 100 and mobile station 200.

Figure 4:
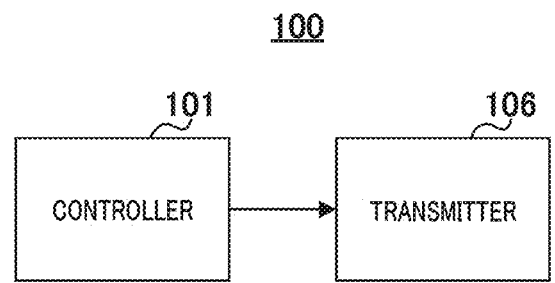
FIG. 4 is a block diagram illustrating an exemplary configuration of a part of a base station.

FIG. 4 is a block diagram illustrating an exemplary configuration of a part of base station 100 according to the present embodiment. In base station 100 illustrated in FIG. 4, controller 101 (e.g., corresponding to control circuitry) determines, based on information on a plurality of second time resources including a first time resource configured for a type 1 (e.g., type B to be described later) mobile station, a resource used for repetition to a type 2 (e.g., type A to be described later) mobile station. Transmitter 106 (e.g., corresponding to transmission circuitry) transmits a signal in the determined resource.

Figure 5:
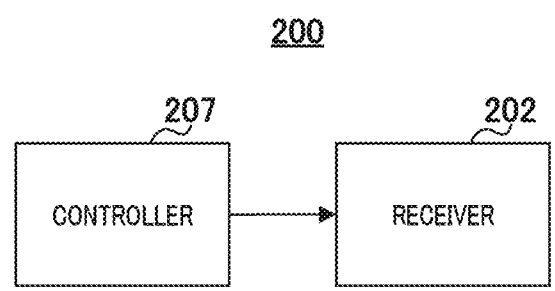
FIG. 5 is a block diagram illustrating an exemplary configuration of a part of a mobile station.

FIG. 5 is a block diagram illustrating an exemplary configuration of apart of mobile station 200 according to the present embodiment. In mobile station 200 illustrated in FIG. 5, controller 207 (e.g., corresponding to control circuitry) determines, based on information on a plurality of second time resources including a first time resource configured for a type 1 mobile station, a resource used for repetition to a type 2 mobile station. Receiver 202 (e.g., corresponding to reception circuitry) receives a signal in the determined resource.

Note that the "time resource" may be replaced by a "transmission period", "transmission occasion", or "monitoring occasion", for example.

[Configuration of Base Station]

Figure 6:
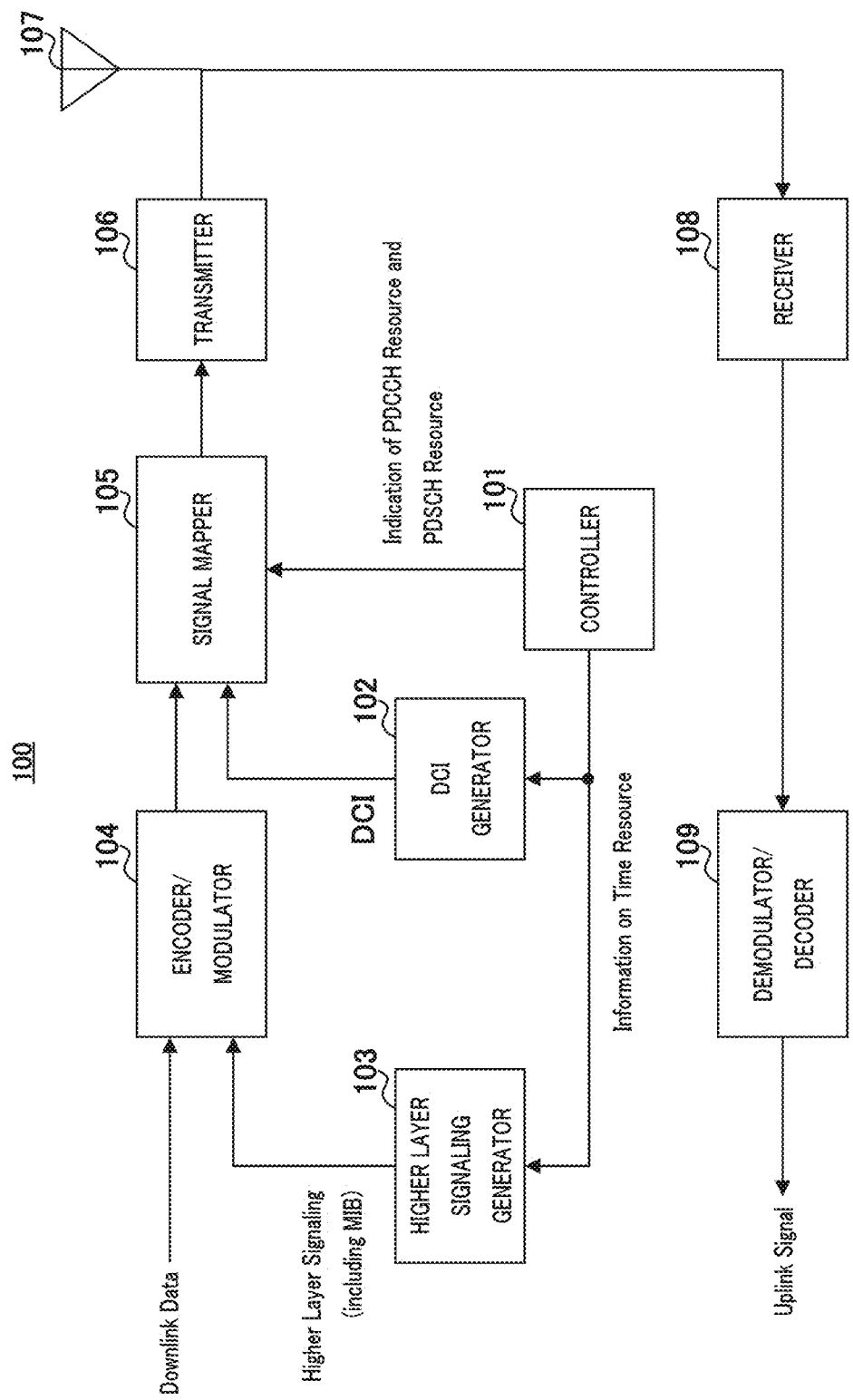
FIG. 6 is a block diagram illustrating an exemplary configuration of the base station.

FIG. 6 is a block diagram illustrating an exemplary configuration of base station 100 according to the present embodiment. In FIG. 6, base station 100 includes controller 101, DCI generator 102, higher layer signaling generator 103, encoder/modulator 104, signal mapper 105, transmitter 106, antenna 107, receiver 108, and demodulator/decoder 109.

Controller 101 may determine a time resource (i.e., transmission period) for repeat transmission (or also referred to as repetition), for example. Controller 101 may determine the time resource for repetition based on an assumed reception capability (e.g., the number of antennas) of the RedCap mobile station, for example. Controller 101 may, for example, output information on the determined time resource to at least one of DCI generator 102 and higher layer signaling generator 103.

In addition, controller 101 outputs (i.e., indicates) information indicating a physical resource of a type0-PDCCH (e.g., referred to as a PDCCH resource) and a physical resource of a PDSCH scheduled by the type0-PDCCH (e.g., referred to as a PDSCH resource), for example, to signal mapper 105.

DCI generator 102 may generate downlink control information (e.g., DCI) including information for explicitly or implicitly indicating a parameter for repetition, for example, based on the information on the time resource inputted from controller 101, and may output the DCI to signal mapper 105.

Higher layer signaling generator 103, for example, generates higher layer signaling (also referred to as a radio resource control (RRC) parameter or a higher layer parameter) including information for explicitly or implicitly indicating a parameter for repetition based on the information on the time resource inputted from controller 101, and outputs the higher layer signaling to encoder/modulator 104. The higher layer signaling may include, for example, an MIB.

Encoder/modulator 104 performs error correction coding and modulation on downlink data (e.g., PDSCH) and the higher layer signaling inputted from higher layer signaling generator 103, and outputs the modulated signals to signal mapper 105.

Signal mapper 105 maps (i.e., assigns) the DCI inputted from DCI generator 102 to the PDCCH resource (e.g., PDCCH resource used for repetition) based on the indication from controller 101. Signal mapper 105 also maps a signal other than the MIB from the signals inputted from encoder/modulator 104 to the PDSCH resource (e.g., PDSCH resource used for repetition) based on the indication from controller 101. In addition, signal mapper 105 maps the MIB inputted from encoder/modulator 104 to a PBCH physical resource (e.g., PBCH resource). Signal mapper 105 outputs the signals assigned to the resources to transmitter 106.

Transmitter 106 performs radio transmission processing such as frequency conversion using a carrier wave on the signals inputted from signal mapper 105, and outputs the signals after the radio transmission processing to antenna 107.

Antenna 107 radiates the signals (i.e., downlink signals) inputted from transmitter 106 toward mobile station 200 (e.g., RedCap mobile station). In addition, antenna 107 receives an uplink signal transmitted from mobile station 200, and outputs the signal to receiver 202.

The uplink signal may be, for example, a signal of a channel such as an uplink data channel (e.g., physical uplink shared channel (PUSCH)), uplink control channel (e.g., physical uplink control channel (PUCCH)), or random access channel (e.g., physical random access channel (PRACH)).

Receiver 108 performs radio reception processing such as frequency conversion on the signal inputted from antenna 107, and outputs the signal after radio reception processing to demodulator/decoder 109.

Demodulator/decoder 109, for example, demodulates and decodes the signal inputted from receiver 108, and outputs the uplink signal.

[Configuration of Mobile Station]

Figure 7:
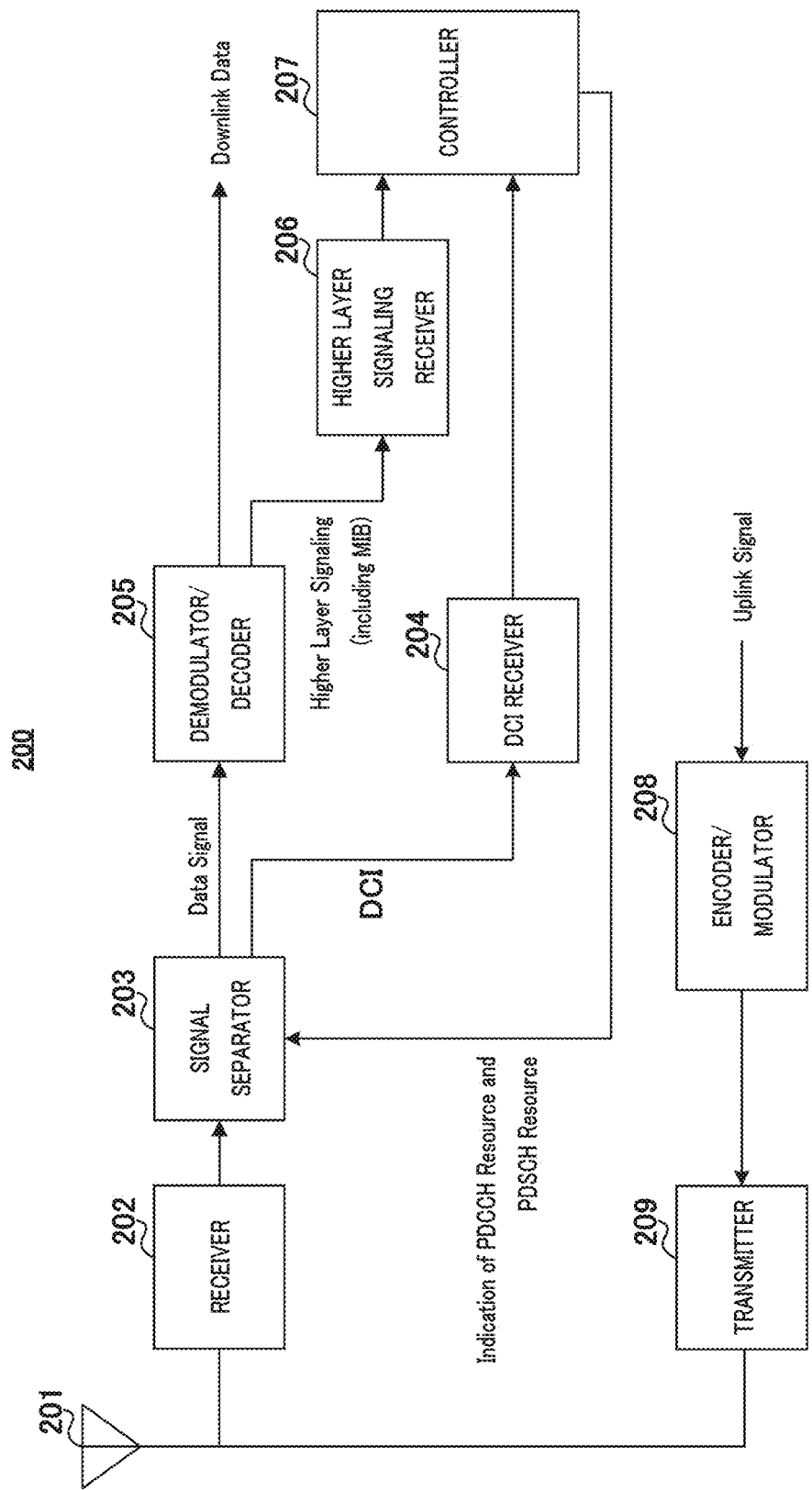
FIG. 7 is a block diagram illustrating an exemplary configuration of the mobile station.

FIG. 7 is a block diagram illustrating an exemplary configuration of mobile station 200 according to the present embodiment. Mobile station 200 may be, for example, a "type A" mobile station, which will be described later, such as the RedCap mobile station.

In FIG. 7, mobile station 200 includes antenna 201, receiver 202, signal separator 203, DCI receiver 204, demodulator/decoder 205, higher layer signaling receiver 206, controller 207, encoder/modulator 208, and transmitter 209.

Antenna 201 receives a downlink signal transmitted by base station 100, and outputs the downlink signal to receiver 202. In addition, antenna 201 radiates an uplink signal (e.g., uplink data signal) inputted from transmitter 209 to base station 100.

Receiver 202 performs radio reception processing such as frequency conversion on the signal inputted from antenna 201, and outputs the signal after radio reception processing to signal separator 203.

Signal separator 203, for example, extracts (i.e., separates) a signal (e.g., DCI) mapped to a PDCCH resource from the signal inputted from receiver 202 in accordance with an indication from controller 207, and outputs the DCI to DCI receiver 204. In addition, signal separator 203 extracts (i.e., separates) a data signal mapped to a PDSCH resource in accordance with an indication from controller 207, and outputs the data signal to demodulator/decoder 205. Signal separator 203 also extracts, for example, an MIB mapped to a PBCH resource, and outputs the MIB to demodulator/decoder 205.

DCI receiver 204, for example, decodes the DCI inputted from signal separator 203, and outputs information on repetition from information obtained by the decoding to controller 207.

Demodulator/decoder 205, for example, performs demodulation and error correction decoding on the data signal and MIB inputted from signal separator 203, and acquires data or higher layer signaling. Demodulator/decoder 205 outputs the higher layer signaling (including the MIB) obtained by the decoding to higher layer signaling receiver 206.

Higher layer signaling receiver 206 outputs, to controller 207, information on repetition from the higher layer signaling inputted from demodulator/decoder 205, for example.

Controller 207 may specify, for example, at least one of a PDCCH resource used for repetition and a PDSCH resource used for repetition. For example, controller 207 may specify the PDCCH resource and PDSCH resource based on at least one of a specified condition, the information inputted from higher layer signaling receiver 206, and the information inputted from DCI receiver 204. Controller 207 outputs (i.e., indicates) information indicating the specified PDCCH resource and PDSCH resource to signal separator 203.

[Exemplary Operations of Base Station 100 and Mobile Station 200]

Next, exemplary operations of above-described base station 100 and mobile station 200 will be described.

In the present embodiment, for example, a shared downlink signal (or shared downlink channel) transmitted by base station 100 can be received by both two types of mobile stations: "type A" and "type B". For example, mobile station 20 illustrated in FIG. 7 may be a mobile station belonging to the type A.

Note that, although two types of mobile stations will be described below, the type of mobile station is not limited to two types, and may be three types or more. For example, a mobile station belonging to a type different from the type A to be described later may be regarded as a mobile station belonging to the type B to be described later.

<Type A>

A mobile station belonging to the type A (e.g., referred to as a type A mobile station) may recognize whether a signal is repeatedly transmitted over a plurality of physical resources in a shared downlink channel, for example. In other words, the type A mobile station may hold, for example, information on a plurality of time resources (or a plurality of transmission periods) where a shared downlink signal is repeatedly transmitted.

For example, the type A mobile station may determine whether a signal is repeatedly transmitted over a plurality of physical resources in a shared downlink channel based on a specified condition or rule, or an indication from base station 100. The repeatedly transmitted signals may be, for example, the same content signals or signals including partially different contents.

In a case where repetition is performed, for example, the type A mobile station may determine a plurality of physical resources used for the repetition, and receive and combine signals respectively allocated to the determined physical resources.

The type A mobile station may be, for example, the RedCap mobile station or a mobile station having at least one of the following characteristics (i.e., features, attributes, or capabilities):

1. Mobile station indicating to base station 100 that it is a "coverage expansion target mobile station", a "mobile station receiving repeatedly transmitted signals", or a "RedCap mobile station";
2. Mobile station with reception antennas implemented the number of which is equal to or less than a threshold (e.g., threshold=1);
3. Mobile station that can support reception antenna ports the number of which is equal to or less than a threshold (e.g., threshold=2);
4. Mobile station that can support multiple-input multiple-output (MIMO) layers (or ranks) the maximum number of which is equal to or less than a threshold (e.g., threshold=2);
5. Mobile station that receives a shared downlink channel in a frequency band of a threshold or higher (e.g., frequency range 2 (FR2)); and
6. Mobile station supporting Rel-17 or later Note that the type A mobile station is a mobile station for which repetition can be expected to be configured, and may be a mobile station that has a characteristic other than the characteristics described above.

<Type B>

A mobile station belonging to the type B (e.g., referred to as a type B mobile station) may be a mobile station that can receive a shared downlink channel without depending on (i.e., without recognizing) a configuration of repetition for the type A, for example.

The type B mobile station may be, for example, the Rel-15/16 mobile station, and may receive a shared downlink channel following a procedure of Rel-15 or Rel-16. The type B mobile station may have a characteristic below, for example;

1. Rel-15/16 mobile station; or
2. Mobile station not belonging to the type A among mobile stations supporting Rel-17 or later.

As described above, the type A mobile station can expand the cell area (i.e., coverage) where a downlink signal (e.g., shared downlink signal) can be received by receiving and combining repeatedly transmitted signals.

In addition, the type B mobile station can perform a reception operation, for example, based on a procedure of Rel-15/16, regardless of signaling or operation to the type A mobile station. Thus, the type B mobile station need not change the implementation in accordance with signaling or operation to the type A mobile station.

Figure 8:
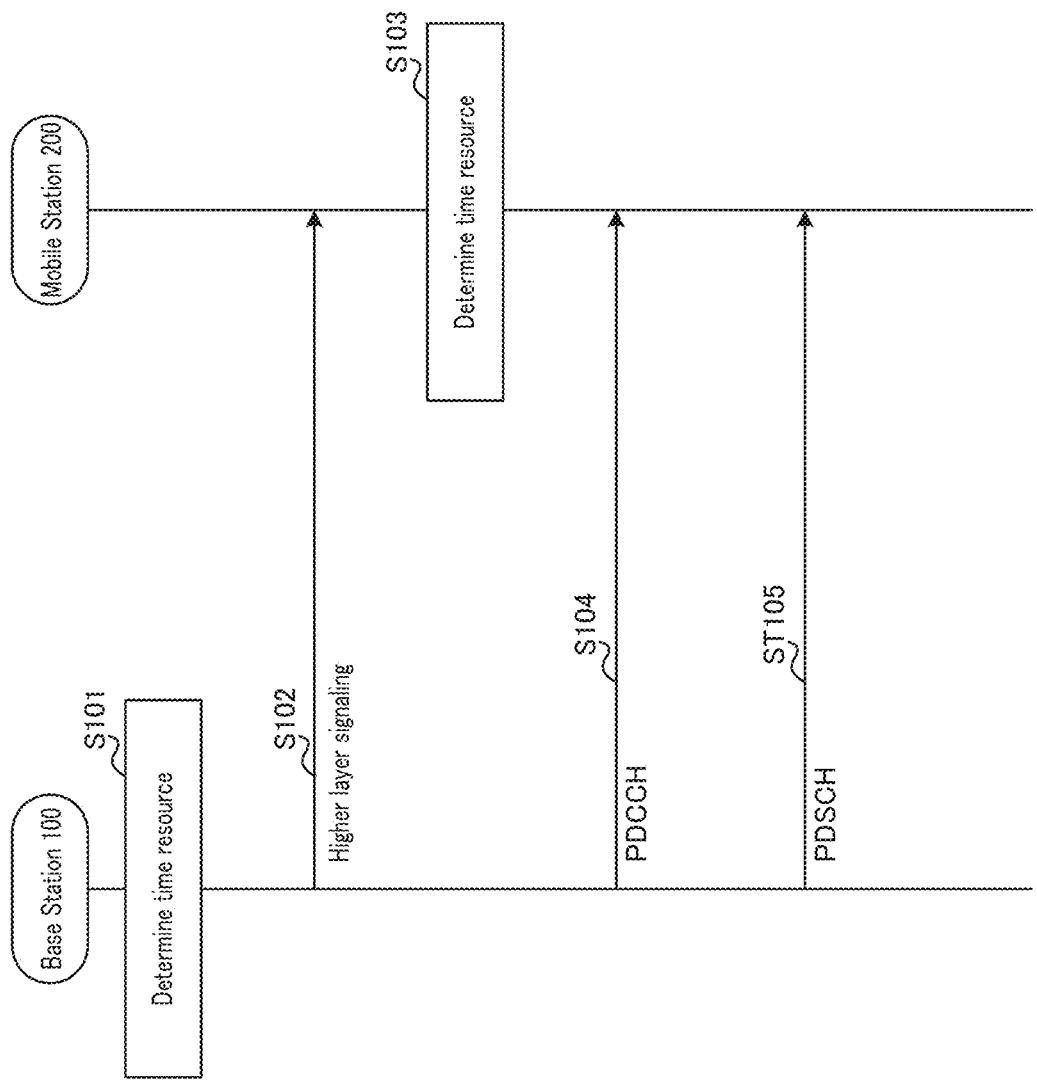
FIG. 8 is a flowchart describing exemplary operations of the base station and the mobile station.

FIG. 8 is a flowchart describing exemplary processing in base station 100 and mobile station 200.

Base station 100 determines, for example, physical resources (e.g., time resources) to be used for a shared downlink signal (e.g., type0-PDCCH or PDSCH) that is repeatedly transmitted to mobile station 200 (e.g., type A mobile station) (S101). For example, the plurality of time resources to be used for the repetition to the type A mobile station may include a time resource configured for the type B mobile station. In other words, the plurality of time resources to be used for the repetition to the type A mobile station may include another time resource in addition to the time resource configured for the type B mobile station.

Base station 100, for example, indicates higher layer signaling to mobile station 200 (S102). Mobile station 200 receives the higher layer signaling indicated from base station 100. The higher layer signaling may include, for example, an MIB. The higher layer signaling may also include, for example, information on repetition to mobile station 200.

Mobile station 200 may determine, for example, the plurality of time resources to be used for the repetition configured for mobile station 200 based on the information included in the higher layer signaling (S103). Note that, in FIG. 8, information on the plurality of time resources configured for mobile station 200 is indicated to mobile station 200 from base station 100 by the higher layer signaling, but the present disclosure is not limited to this. The information on the repetition may be, for example, specified in the standard, configured for mobile station 200 in advance, or indicated to mobile station 200 from base station 100 by a DCI included in a PDCCH.

Base station 100 repeatedly transmits a PDCCH (e.g., type0-PDCCH), for example, in the plurality of time resources configured for mobile station 200 (S104). Mobile station 200, for example, receives the PDCCH that is repeatedly transmitted from base station 100 in the plurality of determined time resources.

Base station 100 transmits, to mobile station 200, a PDSCH the allocation of which is indicated by the PDCCH (in other words, PDSCH scheduled by the PDCCH), for example (S105). Mobile station 200 receives the PDSCH the allocation of which is indicated by the received PDCCH. Note that the PDSCH may be repeatedly transmitted as is the case with the PDCCH, the embodiment of which will be described later.

Next, exemplary operations of the repetition will be described.

Note that, in the following operation examples, the type A mobile station (e.g., mobile station 200) is the RedCap mobile station, and the type B mobile station is the Rel-15/16 mobile station, by way of example.

In the following operation examples, each of a radio frame, slot, and symbol is an exemplary unit of a physical resource in the time domain (i.e., time resource). For example, the length of one radio frame may be 10 milliseconds. One frame may be composed of a plurality (e.g., 10 or 20) of slots, for example. One slot may be composed of a plurality (e.g., 14 or 12) of symbols, for example. One symbol may be the smallest physical resource in the time domain, for example.

Operation Example 1

In Operation Example 1, for example, a downlink signal (e.g., PDCCH or shared downlink control signal) may be repeatedly transmitted over a plurality of radio frames to the RedCap mobile station.

The RedCap mobile station may receive an MIB included in an SSB with high reception level based on a procedure as in Rel-15/16, for example. The RedCap mobile station, for example, may recognize a system frame number (SFN) included in the received MIB, recognize a slot timing from a sequence of PBCH demodulation reference signals (DMRSs), and determine SSB index i of the received SSB. In addition, the RedCap mobile station may calculate a value of slot number $n_0$ (e.g., Expression 1) for receiving (or monitoring) a PDCCH based on information indicated in the received MIB and the determined value of i, for example.

Further, the RedCap mobile station may specify (i.e., recognize) that a PDCCH is repeatedly transmitted in a case where the SFN is a radio frame to be described below, for example, based on a predetermined rule or information indicated by the MIB.

For example, the radio frames where a PDCCH is repeatedly transmitted may be frames that satisfy {SFN mod 2=0} among frames with the same value of floor function Floor (SFN/8). For example, the PDCCH may be repeatedly transmitted in SFNs=0, 2, 4, and 6. The PDCCH may also be repeatedly transmitted in SFNs=8, 10, 12, and 14. Note that information indicated by the PDCCH or the PDCCH resources may be different between SFNs=0, 2, 4, and 6 and SFNs=8, 10, 12, and 14. Note that a description here is about a case of determining radio frames where repetition is performed (e.g., radio frames satisfying {SFN mod 2=0}) for every eight radio frames (i.e., group of eight radio frames), but the number of radio frames included in the group is not limited to eight and may be another number.

Figure 9:
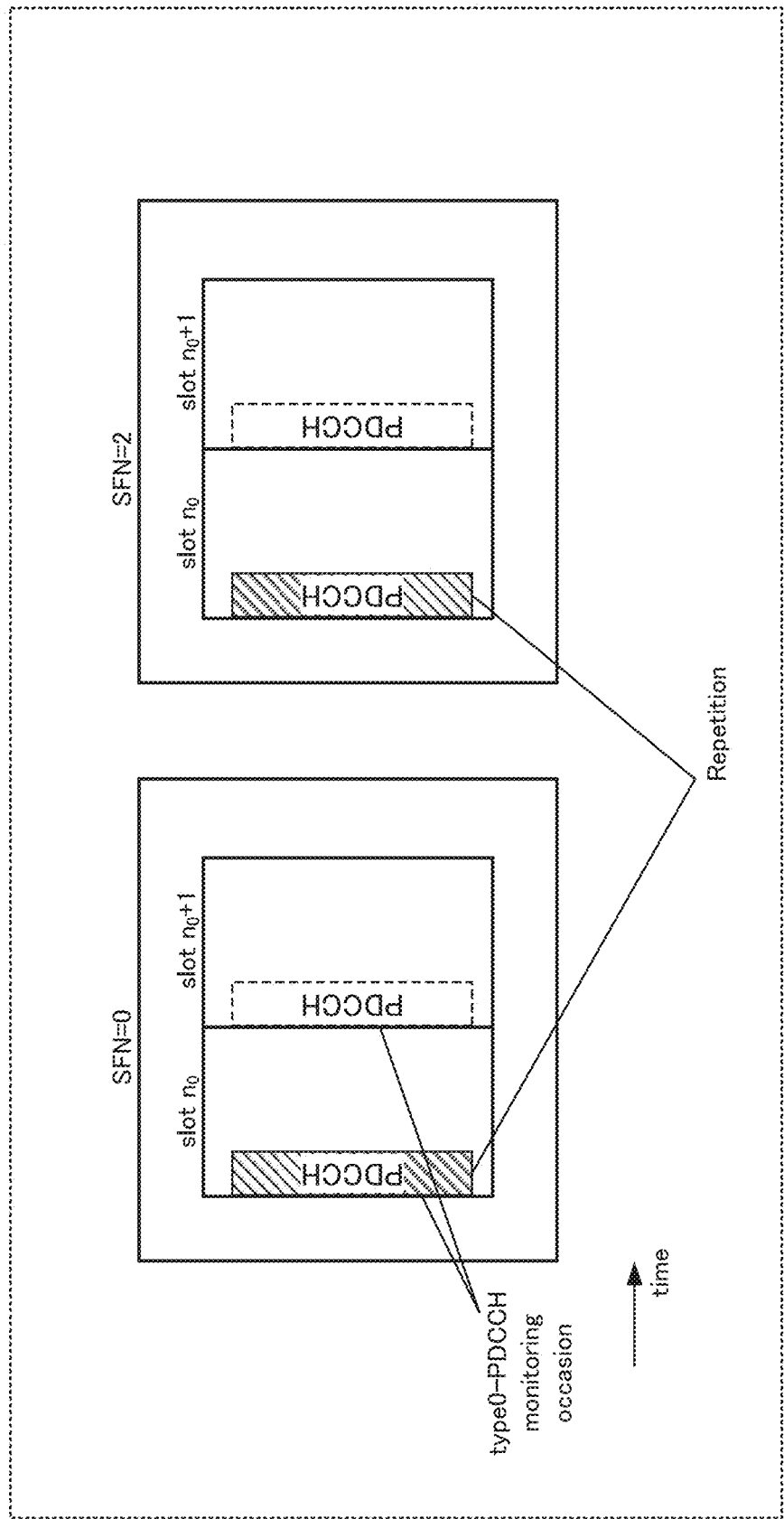
FIG. 9 illustrates exemplary repetition according to Operation Example 1.

For example, as illustrated in FIG. 9, the RedCap mobile station may recognize that a PDCCH is possibly repeatedly transmitted in slots $n_0$ of respective SFNs=0, 2, 4, and 6 and slots $n_0+1$ of respective SFNs=0, 2, 4, and 6, and may attempt to detect a type0-PDCCH. For example, the RedCap mobile station may attempt to detect a type0-PDCCH by combining signals in slots $n_0$ of respective SFNs=0, 2, 4, and 6. Likewise, the RedCap mobile station may attempt to detect a type0-PDCCH by combining signals in slots $n_0+1$ of respective SFNs=0, 2, 4, and 6, for example.

As described above, in Operation Example 1, the plurality of time resources used for repetition to the RedCap mobile station include slot $n_0$ or $n_0+1$ (i.e., time resource possibly configured for Rel-15/16 mobile station) that is configured for each of a plurality of radio frames and indicated by the MIB. For example, the RedCap mobile station may hold information on the radio frames used for repetition. Then, the RedCap mobile station may receive the type0-PDCCH in slot $n_0$ or $n_0+1$ in each of the radio frames used for repetition, for example.

According to Operation Example 1, the RedCap mobile station can improve reception accuracy (i.e., coverage) of the PDCCH by combining the repeatedly transmitted PDCCHs, for example, even with a small number of antennas compared to the Rel-15/16 mobile station.

In addition, the time resource used for repetition to the RedCap mobile station is configured to be a time resource configured for the Rel-15/16 mobile station in each of a plurality of radio frames, thereby preventing an increase in physical resources where the PDCCH can be mapped.

Further, the physical resources where the PDCCH can be mapped are the same as in Rel-15/16, and this eliminates the need for making an engineering change to the Rel-15/16 mobile station.

Operation Example 2

In Operation Example 2, for example, a downlink signal (e.g., PDCCH or shared downlink control signal) may be repeatedly transmitted to the RedCap mobile station over a plurality of slots (e.g., slot $n_0$ and slot $n_0+1$).

The RedCap mobile station may receive an MIB included in an SSB with high reception level based on a procedure as in Rel-15/16, for example. The RedCap mobile station, for example, may recognize the system frame number (SFN) included in the received MIB, recognize a slot timing from a sequence of PBCH DMRSs, and determine SSB index i of the received SSB. In addition, the RedCap mobile station may calculate a value of slot number $n_0$ (e.g., Expression 1) for receiving (or monitoring) a PDCCH based on information indicated in the received MIB and the determined value of i, for example.

Figure 10:
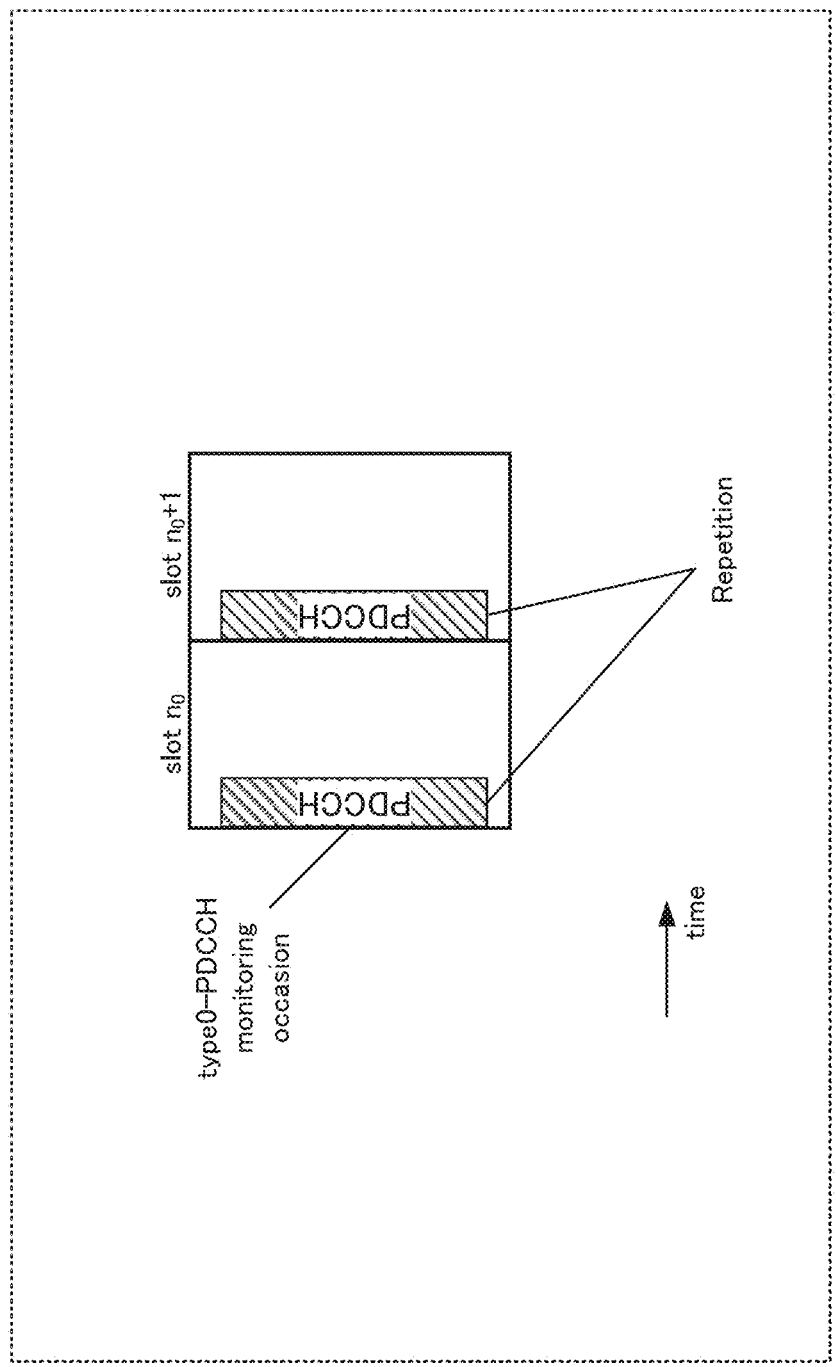
FIG. 10 illustrates exemplary repetition according to Operation Example 2.

Further, the RedCap mobile station may specify (i.e., recognize) that a PDCCH is repeatedly transmitted in slot $n_0$ and slot $n_0+1$ in a certain radio frame, as illustrated in FIG. 10, for example, based on a predetermined rule or information indicated by the MIB.

For example, as illustrated in FIG. 10, the RedCap mobile station may recognize that a PDCCH is possibly repeatedly transmitted in slot $n_0$ and slot $n_0+1$ in the certain radio frame, and may attempt to detect a type0-PDCCH. For example, the RedCap mobile station may attempt to detect a type0-PDCCH by combining signals in slot $n_0$ and slot $n_0+1$.

Thus, in Operation Example 2, the plurality of time resources used for repetition to the RedCap mobile station may include slot $n_0$ (i.e., unit time period configured for the Rel-15/16 mobile station) indicated by the MIB and slot $n_0+1$ that follows slot $n_0$. For example, the RedCap mobile station may hold information on the radio frame used for repetition. Then, the RedCap mobile station may receive the type0-PDCCH in slots $n_0$ and $n_0+1$ in the radio frame used for repetition, for example.

According to Operation Example 2, the RedCap mobile station can improve reception accuracy (i.e., coverage) of the PDCCH by combining the repeatedly transmitted PDCCHs, for example, even with a small number of antennas compared to the Rel-15/16 mobile station.

Further, for example, the number of times the PDCCHs are combined (i.e., the number of reception times) in a certain radio frame is greater than that in Rel-15/16, and thus the reception accuracy of the PDCCH can be improved in a short time as compared to Operation Example 1.

Furthermore, the physical resources where the PDCCH can be mapped are the same as in Rel-15/16, and this eliminates the need for making an engineering change to the Rel-15/16 mobile station.

Note that the number of the above-described certain radio frames may be one or more than one.

In addition, Operation Example 2 may be applied to the RedCap mobile station to which SS/PBCH block and CORESET multiplexing pattern=1 is indicated and need not be applied to the RedCap mobile station to which SS/PBCH block and CORESET multiplexing pattern=2 or 3 is indicated, for example. This allows the RedCap mobile station to receive repeatedly transmitted downlink signals utilizing two slots $n_0$ and $n_0+1$ to be monitored when SS/PBCH block and CORESET multiplexing pattern=1 is indicated, for example.

Operation Example 3

In Operation Example 3, for example, a downlink signal (e.g., PDCCH or shared downlink control signal) may be repeatedly transmitted to the RedCap mobile station over a plurality of slots (e.g., slot $n_0$ and slot $n_0-k$). Note that k may be an integer equal to or greater than 0.

The RedCap mobile station may receive an MIB included in an SSB with high reception level based on a procedure as in Rel-15/16, for example. The RedCap mobile station, for example, may recognize the system frame number (SFN) included in the received MIB, recognize a slot timing from a sequence of PBCH DMRSs, and determine SSB index i of the received SSB. In addition, the RedCap mobile station may calculate a value of slot number $n_0$ (e.g., Expression 1) for receiving (i.e., monitoring) a PDCCH based on information indicated in the received MIB and the determined value of i, for example.

Figure 11:
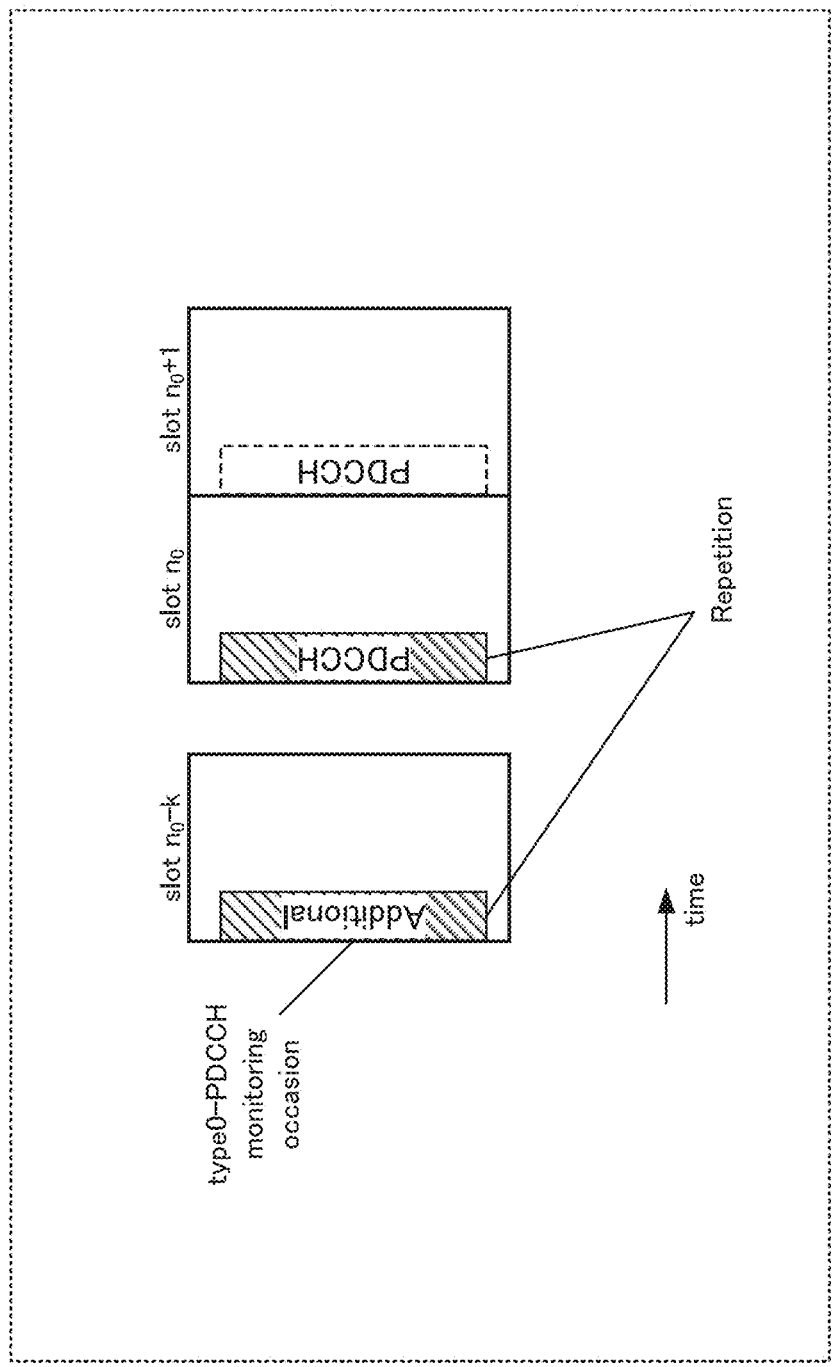
FIG. 11 illustrates exemplary repetition according to Operation Example 3.

Further, the RedCap mobile station may specify (i.e., recognize) that a PDCCH is repeatedly transmitted in slot $n_0$ and slot $n_0-k$ in a certain radio frame, as illustrated in FIG. 11, for example, based on a predetermined rule or information indicated by the MIB.

For example, as illustrated in FIG. 11, the RedCap mobile station may recognize that a PDCCH is possibly repeatedly transmitted in slot $n_0$ and slot $n_0-k$ in the certain radio frame, and may attempt to detect a type0-PDCCH. For example, the RedCap mobile station may attempt to detect a type0-PDCCH by combining signals in slot $n_0$ and slot $n_0-k$.

As described above, in Operation Example 3, the plurality of time resources used for repetition to the RedCap mobile station may include slot $n_0$ (i.e., unit time period configured for the Rel-15/16 mobile station) indicated by the MIB and slot $n_0-k$ that comes earlier than slot $n_0$. For example, the RedCap mobile station may hold information on the radio frame used for repetition. Then, the RedCap mobile station may receive the type0-PDCCH in slots $n_0$ and $n_0-k$ in the radio frame used for repetition, for example.

According to Operation Example 3, the RedCap mobile station can improve reception accuracy (i.e., coverage) of the PDCCH by combining the repeatedly transmitted PDCCHs, for example, even with a small number of antennas compared to the Rel-15/16 mobile station.

Further, for example, the number of times the PDCCHs are combined (i.e., the number of reception times) in a certain radio frame is greater than that in Rel-15/16, and thus the reception accuracy of the PDCCH can be improved in a short time as compared to Operation Example 1.

Furthermore, since the RedCap mobile station receives the repeatedly transmitted PDCCHs in slot $n_0$ and slot $n_0-k$ that comes earlier than slot $n_0$, for example, the PDCCH can be decoded at an earlier timing (e.g., slot $n_0$).

In addition, the physical resources where the PDCCH (e.g., type0-PDCCH) can be mapped are the same as in Rel-15/16, and this eliminates the need for making an engineering change to the Rel-15/16 mobile station.

Note that the number of the above-described certain radio frames may be one or more than one.

The slots where the PDCCH is repeatedly transmitted may be slot $n_0+1$ and slot $n_0-k$, or may be slot $n_0$, slot $n_0+1$, and slot $n_0-k$. A plurality of values of k may be indicated to the RedCap mobile station, and the PDCCH may be repeatedly transmitted in slot $n_0-k$ corresponding to each of the plurality of values of k.

Operation Example 3 may be applied to a case where no other channels or signals, such as an SSB or channel state information-reference signal (CSI-RS), are mapped to slot $n_0-k$, and need not be applied to a case where another channel or signal is mapped to slot $n_0-k$, for example.

In Operation Example 3, the description is about a case where the slots used for repetition include slot $n_0-k$ that comes earlier than slot $n_0$, but the present disclosure is not limited to this, and slot $n_0+k$ that comes later than slot $n_0$ may be included, for example.

Operation Example 4

In Operation Example 4, for example, a downlink signal (e.g., PDCCH or shared downlink control signal) may be repeatedly transmitted to the RedCap mobile station over slots respectively linked with (i.e., associated with) a plurality of SSB indices.

The RedCap mobile station may receive an MIB included in an SSB with high reception level based on a procedure as in Rel-15/16, for example. The RedCap mobile station, for example, may recognize the system frame number (SFN) included in the received MIB, recognize a slot timing from a sequence of PBCH DMRSs, and determine SSB index i of the received SSB. In addition, the RedCap mobile station may calculate a value of slot number $n_0$ (e.g., Expression 1) for receiving (i.e., monitoring) a PDCCH based on information indicated in the received MIB and the determined value of i, for example.

Figure 12:
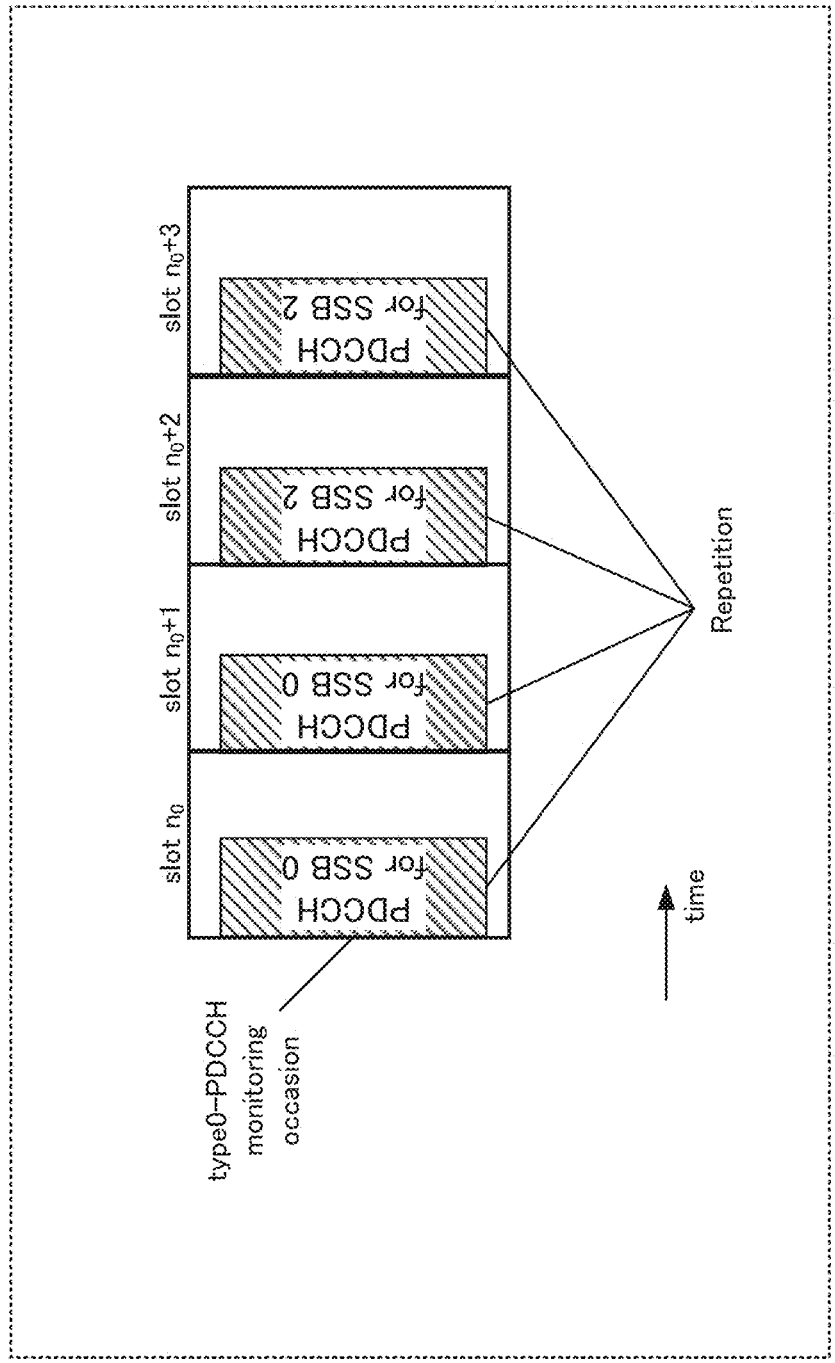
FIG. 12 illustrates exemplary repetition according to Operation Example 4.

Further, the RedCap mobile station may specify (i.e., recognize) that a PDCCH is repeatedly transmitted in slot $n_0$ and slot $n_0+1$ calculated from SSB index i, and slot $n_0+2$ and slot $n_0+3$ calculated from SSB index i+2 in a certain radio frame, as illustrated in FIG. 12, for example, based on a predetermined rule or information indicated by the MIB.

For example, as illustrated in FIG. 12, the RedCap mobile station may recognize that a PDCCH is possibly repeatedly transmitted in slots $n_0$, $n_0+1$, $n_0+2$, and $n_0+3$ in the certain radio frame, and may attempt to detect a type0-PDCCH. For example, the RedCap mobile station may attempt to detect a type0-PDCCH by combining signals in slots $n_0$, $n_0+1$, $n_0+2$, and $n_0+3$.

As described above, in Operation Example 4, the plurality of time resources used for repetition to the RedCap mobile station may include a plurality of slots associated with the index of at least one of a plurality of SSBs. For example, the RedCap mobile station may hold information on the radio frame used for repetition. Then, the RedCap mobile station may receive the type0-PDCCH in the slots in the radio frame used for repetition, for example.

According to Operation Example 4, the RedCap mobile station can improve reception accuracy (i.e., coverage) of the PDCCH by combining the repeatedly transmitted PDCCHs, for example, even with a small number of antennas compared to the Rel-15/16 mobile station.

Further, for example, the number of times the PDCCHs are combined (i.e., the number of reception times) in a certain radio frame is greater than that in Rel-15/16, and thus the reception accuracy of the PDCCH can be improved in a short time as compared to Operation Example 1.

In addition, the physical resources where the PDCCH (e.g., type0-PDCCH) can be mapped are the same as in Rel-15/16, and this eliminates the need for making an engineering change to the Rel-15/16 mobile station.

Note that the number of the above-described certain radio frames may be one or more than one.

The SSB indices for calculating slots where the PDCCH is repeatedly transmitted is not limited to i and i+2, and may be other values. In other words, the slots where the PDCCH is repeatedly transmitted may be different from slots $n_0$, $n_0+1$, $n_0+2$, and $n_0+3$. For example, the RedCap mobile station may be configured with slots associated with a predetermined number (e.g., two) of SSB indices with higher reception level among a plurality of SSB indices.

In a plurality of slots (e.g., slots $n_0$, $n_0+1$, $n_0+2$, and $n_0+3$) configured for the RedCap mobile station, for example, the PDCCH may be transmitted using the same beam (e.g., beam corresponding to SSB index=i selected by the RedCap mobile station).

Figure 13:
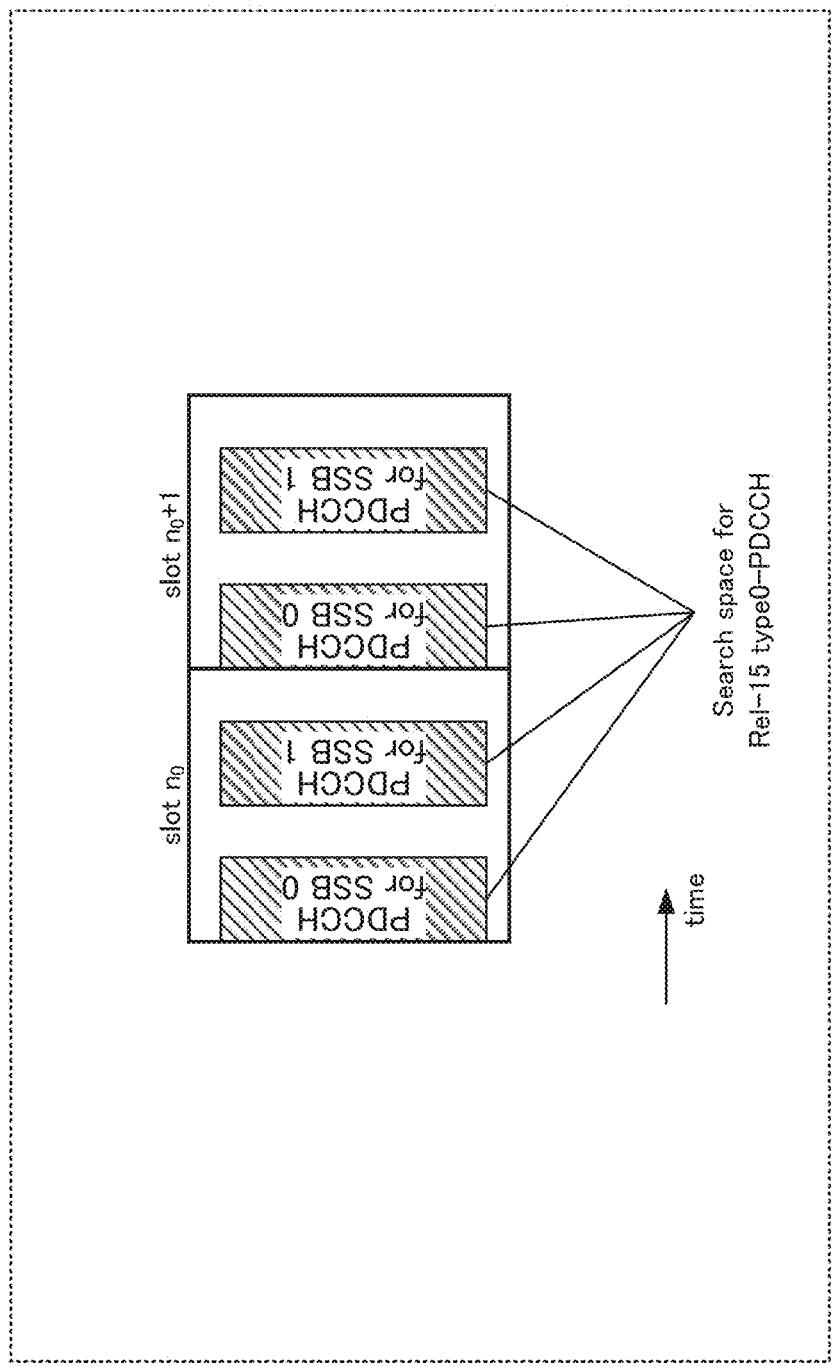
FIG. 13 illustrates exemplary repetition according to Operation Example 4.

Note that Operation Example 4 may be applied to a case where M=½ is indicated in the MIB, and need not be applied in a case where M=½ is not applied (e.g., case where M=1), for example. In the case where M=½, the PDCCHs corresponding to two SSB indices are mapped per slot as illustrated in FIG. 13, for example. For example, the PDCCHs respectively corresponding to SSB indices=0 and 1 may be both mapped to slots $n_0$ and $n_0+1$, as illustrated in FIG. 13.

For example, the RedCap mobile station may monitor slots $n_0$ and $n_0+1$ in a certain radio frame and detect a type0-PDCCH. The RedCap mobile station may then, for example, combine the detected PDCCHs and decode a DCI. According to this method, the RedCap mobile station can improve reception accuracy of the PDCCH by combining the repeatedly transmitted PDCCHs, for example, even with a small number of antennas compared to the Rel-15/16 mobile station. Further, for example, the number of times the PDCCHs are received in a slot is greater than that in Rel-15/16, and thus the reception accuracy of the PDCCH can be improved in a shorter time. Furthermore, in the case where M=½, a smaller number of slots may be used for repetition compared to the case where M=1.

The exemplary repetition operations have been described, thus far.

As described above, in the present embodiment, base station 100 and mobile station 200 determine a resource to be used for repetition to the type A mobile station based on information on a plurality of time resources including a time resource (e.g., slot) configured for the type B mobile station.

This enables the type A mobile station, for example, to receive a downlink signal (e.g., shared downlink signal) in the coverage equivalent to that of the type B mobile station (e.g., Rel-15/16 mobile station). Thus, the present embodiment makes it possible to improve the received quality of a downlink signal in mobile station 200.

In addition, a plurality of time resources including a time resource configured for the type B mobile station are used for repetition to the type A mobile station. For example, the type A mobile station may receive PDCCHs in a plurality of time resources used for repetition based on a time resource (e.g., slot) indicated by an MIB and information on repetition. Meanwhile, the type B mobile station may receive a PDCCH in a time resource indicated by an MIB regardless of the configuration for the type A mobile station, for example. Thus, according to the present embodiment, a method of receiving a shared downlink signal by the type B mobile station is not changed depending on a method of receiving a shared downlink signal by the type A mobile station.

Variation of Operation Examples 1 to 4

Although the PDCCH is repeatedly transmitted in Operation Examples 1 to 4, the downlink signal repeatedly transmitted is not limited to the PDCCH. The downlink signal repeatedly transmitted may be, for example, at least one of the PDCCH and the PDSCH the allocation of which is indicated by the PDCCH.

For example, the repetition may be applied to the PDSCH scheduled by a plurality of PDCCHs that are repeatedly transmitted.

Figure 14:
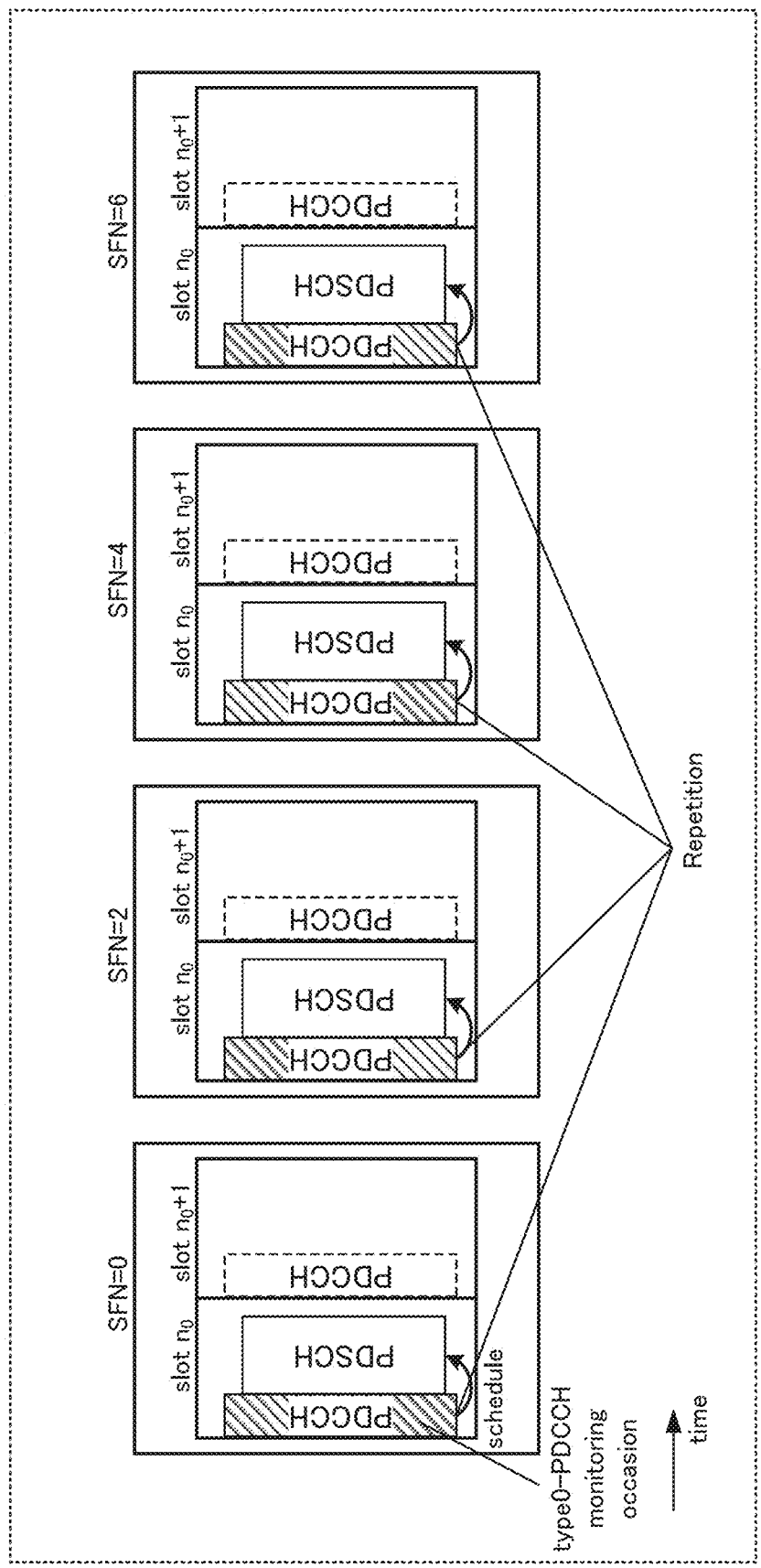
FIG. 14 illustrates exemplary repetition according to Variation of Operation Examples 1 to 4.

For example, the RedCap mobile station may specify that the PDSCH is repeatedly transmitted in radio frames with SFNs=0, 2, 4, and 6, as illustrated in FIG. 14, based on a predetermined rule or information indicated by an MIB. The RedCap mobile station may then receive and combine the repeatedly transmitted PDSCHs, for example, and decode the data. Note that radio frames where the PDSCH is repeatedly transmitted are not limited to the radio frames with SFNs=0, 2, 4, and 6.

The RedCap mobile station can improve reception accuracy of the PDSCH by combining the PDSCHs, for example, even with a small number of antennas compared to the Rel-15/16 mobile station.

For example, the RedCap mobile station may recognize that the PDCCH is repeatedly transmitted in the radio frames with SFNs=0 and 2 and the PDSCH is repeatedly transmitted in the radio frames with SFNs=4 and 6, which come after SFNs=0 and 2, based on a predefined rule or information indicated by an MIB. Then the RedCap mobile station, for example, may receive and combine the repeatedly transmitted PDCCHs, decode a DCI, receive and combine the PDSCHs, and decode the data. This method eliminates the need for buffering a signal that may correspond to the PDSCH before decoding a DCI by the RedCap mobile station, for example, thereby reducing memory consumption.

Note that the description here is about a case where the RedCap mobile station receives the PDCCHs in SFNs=0 and 2 and receives the PDSCHs in SFNs=4 and 6, but the present disclosure is not limited to this. For example, the RedCap mobile station may receive the PDCCH (e.g., control signal) in at least one transmission period among a plurality of transmission periods (e.g., radio frames with SFNs=0, 2, and 4) where repetition is performed, and may receive the PDSCH (e.g., data signal) in transmission periods (e.g., radio frames with SFNs=4 and 6) that come after the at least one transmission period.

Variation 1 of Operation Examples 2 to 4

In Operation Examples 2 to 4, the repetition may be applied to the PDSCH scheduled by the PDCCH that is transmitted in a certain radio frame.

Figure 15:
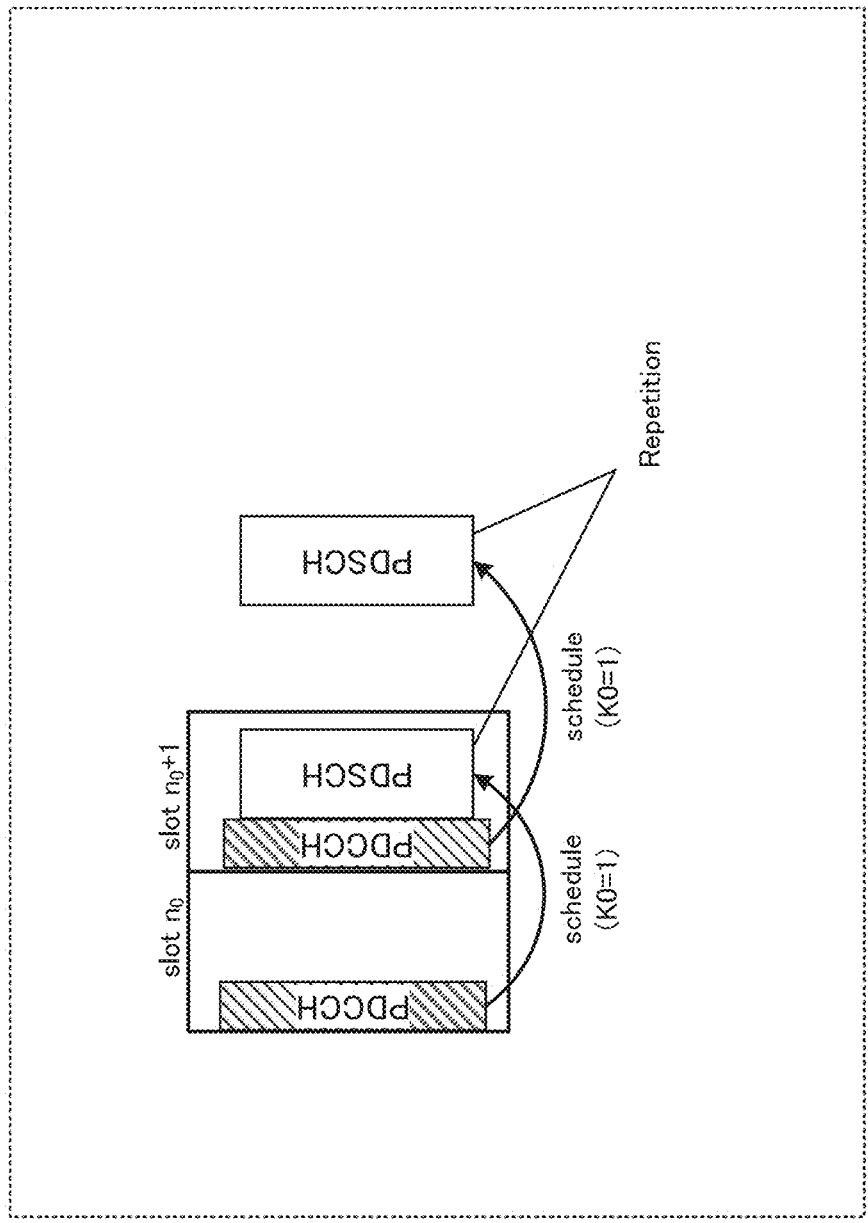
FIG. 15 illustrates exemplary repetition according to Variation 1 of Operation Examples 2 to 4.

For example, the RedCap mobile station may specify that the PDSCH scheduled by each of a plurality of PDCCHs in a certain radio frame is repeatedly transmitted, as illustrated in FIG. 15, based on a predetermined rule or information indicated by an MIB. The RedCap mobile station may then receive and combine the repeatedly transmitted PDSCHs, for example, and decode the data.

The RedCap mobile station can improve reception accuracy of the PDSCH by combining the PDSCHs, for example, even with a small number of antennas compared to the Rel-15/16 mobile station. Further, for example, the number of times the PDSCHs are received in a radio frame by the RedCap mobile station is greater than that in Rel-15/16, and thus the reception accuracy can be further improved by combining the PDSCHs.

For example, the RedCap mobile station may recognize, by K0 indicated by a combination of higher layer signaling and a parameter included in a DCI in the PDCCH, that the PDSCH is received in a time resource after receiving a plurality of PDCCHs repeatedly transmitted in a certain radio frame. K0 is a value indicating a time offset between the PDCCH and the PDSCH scheduled by the PDCCH, for example. For example, an indication of K0>0 to the RedCap mobile station may be specified in advance. This method eliminates the need for buffering a signal that may correspond to the PDSCH before decoding a DCI by the RedCap mobile station, for example, thereby reducing memory consumption.

Variation 2 of Operation Examples 2 to 4

In Operation Examples 2 to 4, the repetition may be applied to, besides the PDSCH scheduled by the PDCCH that is transmitted in a certain radio frame, the PDSCH mapped to another slot.

Figure 16:
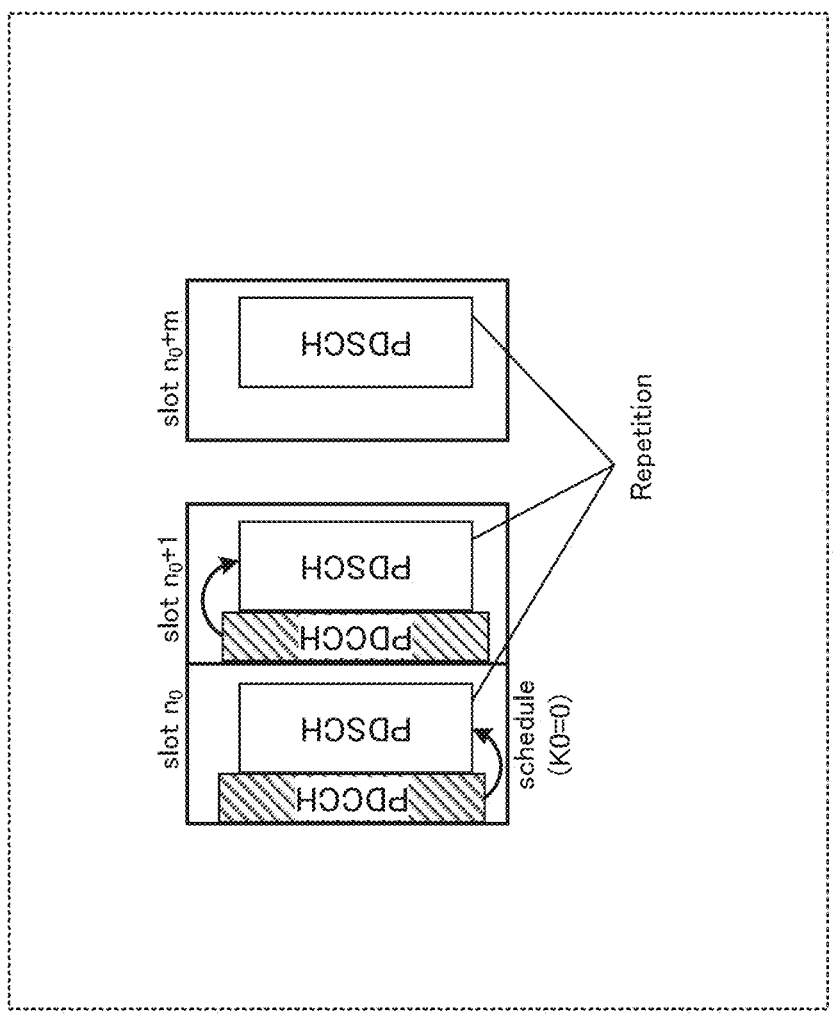
FIG. 16 illustrates exemplary repetition according to Variation 2 of Operation Examples 2 to 4.

For example, the RedCap mobile station may specify that the PDSCH scheduled by each of a plurality of PDCCHs in a certain radio frame is repeatedly transmitted, as illustrated in FIG. 16, based on a predetermined rule or information indicated by an MIB. The RedCap mobile station may specify that slot $n_0+m$ is mapped with the PDSCH and used for repetition, for example. The RedCap mobile station may then receive and combine the repeatedly transmitted PDSCHs, for example, and decode the data.

Note that m is a time offset and may be an integer equal to or greater than 0.

The RedCap mobile station can improve reception accuracy of the PDSCH by combining the PDSCHs, for example, even with a small number of antennas compared to the Rel-15/16 mobile station. Further, for example, the number of times the PDSCHs are received in a radio frame by the RedCap mobile station is greater than that in Rel-15/16, and thus the reception accuracy can be further improved by combining the PDSCHs.

Figure 17:
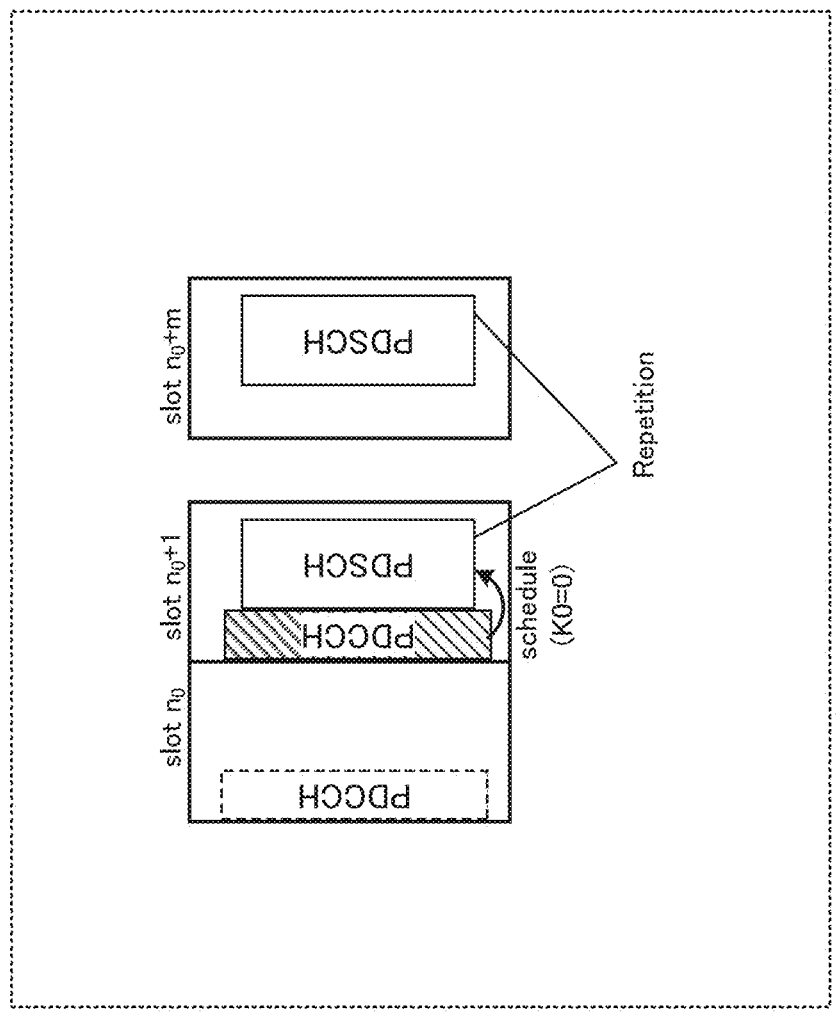
FIG. 17 illustrates exemplary repetition according to Variation 2 of Operation Examples 2 to 4.

Alternatively, as illustrated in FIG. 17, for example, the RedCap mobile station may specify (or recognize) that the PDCCH is not repeatedly transmitted while the PDSCH is repeatedly transmitted. For example, as illustrated in FIG. 17, the RedCap mobile station may perform reception recognizing that the PDCCH is transmitted in a single slot of slot $n_0+1$, and that the PDSCH (e.g., slot $n_0+1$) scheduled by the PDCCH and the PDSCH in slot $n_0+m$ are used for repetition. This reduces the use of PDCCH resources and the PDSCH can be repeatedly transmitted.

For example, the RedCap mobile station may recognize, by parameter K0 included in a DCI in the PDCCH, that the PDSCH is received in a time resource after receiving a plurality of PDCCHs repeatedly transmitted in a certain radio frame. For example, an indication of K0>0 to the RedCap mobile station may be specified in advance. This method eliminates the need for buffering a signal that may correspond to the PDSCH before decoding a DCI by the RedCap mobile station, for example, thereby reducing memory consumption.

The operation of Variation 2 of Operation Examples 2 to 4 may be applied to a case where no other channels or signals, such as an SSB or CSI-RS, are mapped to slot $n_0+m$, and need not be applied to a case where another channel or signal is mapped to slot $n_0+m$, for example.

Further, in the operation of Variation 2 of Operation Examples 2 to 4, for example, a plurality of values of K0 included in DCIs in the PDCCHs may be indicated to the RedCap mobile station, and the PDSCH may be repeatedly transmitted in a plurality of slots respectively corresponding to the plurality of values of K0.

The embodiments of the present disclosure have been described, thus far.

Other Embodiments

In the above embodiments, at least one of the following may be the same in each of the repeatedly transmitted PDCCHs and PDSCHs: information to be indicated (carried); frequency position (e.g., subcarrier and position of resource block); time length; and modulation scheme (e.g., modulation and coding scheme (MCS)). In addition, different redundancy values (RVs) may be respectively applied to data portions of the repeatedly transmitted PDSCHs. Alternatively, CCE may be the same and the frequency position may be different in the PDCCH repetition in a user-specific search space (USS).

In the above embodiments, the information on repetition (or a plurality of transmission periods), such as one or more radio frames and parameter k or m, may be predefined in the standard, may be preconfigured to a mobile station, or may be implicitly or explicitly indicated from base station 100 to mobile station 200 by control information such as an MIB, higher layer signaling, or DCI.

Further, in the above embodiments, as illustrated in FIG. 18 and FIG. 19 for example, a column corresponding to a parameter (e.g., parameter for repetition) for the type A mobile station may be added to an existing table (e.g., FIG. 3A and FIG. 3B) for the CORESET for type0-PDCCH (or monitoring occasions for type0-PDCCH) indicated by an MIB, and a parameter used for repetition may be implicitly indicated to the type A mobile station. Note that the associations between the parameters used for repetition and the other parameters in FIG. 18 and FIG. 19 are merely examples and not limited thereto. Alternatively, different tables may be respectively configured for the type A mobile station and the type B mobile station.

The PDCCH repeatedly transmitted in the above embodiments may be scrambled by a system information-radio network temporary identifier (SI-RNTI), for example.

The method of combining signals in the above embodiments may be, for example, a combining method called soft combining, or a receiving method in which a signal with strong received power is used and a signal with weak received power is not used.

In combining the PDCCHs in the above embodiments, the type A mobile station may combine the PDCCHs based on a channel estimate after completing channel estimation using a DMRS for the PDCCH. In other words, the type A mobile station may combine signals on a PDCCH resource excluding a DMRS, for example. Alternatively, it may be indicated to the type A mobile station that DMRSs for the PDCCH in the same sequence are transmitted, and the type A mobile station may combine the DMRSs.

The PDSCH repeatedly transmitted in the above embodiments may carry a system information block type1 (SIB1), other system information, or other shared information.

Further, the above embodiments have described repetition for a type0-PDCCH and a PDSCH scheduled by the type0-PDCCH, but a signal repeatedly transmitted may be another shared downlink signal. Exemplary shared downlink signals or shared downlink channels include the following signals/channels:

Random access preamble (RAR);
PDSCH for message 4 (Contention resolution);
Paging; and
PDCCH for group common DCI (DCI format 2_0, 2_1_22, 2_3, 2_X, etc.).

In addition, a single mobile station may switch between the type A and type B in the above embodiments. For example, a mobile station can be configured to be the type A to improve the coverage as described above, and can be configured to be the type B to reduce the number of signal reception times compared to the type A and reduce power consumption.

Although the downlink communication has been described in the above embodiments, an embodiment of the present disclosure is not limited to being applied to this, and may be applied to uplink communication or communication between mobile stations, e.g., sidelink communication.

In the above embodiments, repetition is limited to being performed in the time direction, and may be performed in the frequency direction.

In the above embodiments, the state (e.g., mode) of the type A mobile station may be the RRC_IDLE mode, RRC_INACTIVE mode, or RRC_CONNECTED mode. In other words, the state of the type A mobile station may be either before or after the RRC configuration.

In the above embodiments, the "higher layer signaling" may also be referred to as "RRC signaling" or "MAC signaling", for example.

In the above embodiments, the time resource unit is not limited to a radio frame, slot, and symbol, and may be another unit. In addition, the number of slots composing the radio frame length or radio frame and the number of symbols composing the slot are not limited to the above examples, and may be different numbers.

(Control Signal)

In the above embodiments, the control signal may be a PDCCH transmitting a DCI of the physical layer, or may be MAC of the higher layer or RRC.

(Base Station)

In the above embodiments, the base station may be a transmission reception point (TRP), a clusterhead, an access point, a remote radio head (RRH), an eNodeB (eNB), a gNodeB (gNB), a base station (BS), a base transceiver station (BTS), a base unit, or a gateway, for example. Further, in side link communication, a terminal may be adopted instead of a base station.

(Uplink/Downlink)

The above embodiments have been described with the PDSCH as an example, but the present disclosure is not limited to the PDSCH and may be applied to the PUSCH or PRACH.

(Data Channel/Control Channel)

The above embodiments have been described with the PDSCH used for data transmission as an example, but the present disclosure is not limited to the PDSCH and may be applied to the PDCCH or PBCH used for transmission of control information.

(Reference Signals)

In the above embodiments, the reference signals are signals known to both a base station and a mobile station and each reference signal may be referred to as a reference signal (RS) or sometimes a pilot signal. The reference signal may be any of a DMRS, a channel state information—reference signal (CSI-RS), a tracking reference signal (TRS), a phase tracking reference signal (PTRS), and a cell-specific reference signal (CRS).

(Time Intervals)

In the present disclosure, time resource units are not limited to one or a combination of slots and symbols, and may be time resource units, such as frames, superframes, subframes, slots, time slot subslots, minislots, or time resource units, such as symbols, orthogonal frequency division multiplexing (OFDM) symbols, single carrier-frequency division multiplexing access (SC-FDMA) symbols, or other time resource units. The number of symbols included in one slot is not limited to any number of symbols exemplified in the embodiments described above, and may be other numbers of symbols.

(Application to Sidelink)

The above embodiments may be applied to the communication using the sidelink for vehicle to everything (V2X) or communication between terminals. In this case, the PDCCH may be replaced by a physical sidelink control channel (PSCCH), the PUSCH/PDSCH may be replaced by a physical sidelink shared channel (PSSCH), and the PUCCH may be replaced by a physical sidelink feedback channel (PSFCH).

<5G NR System Architecture and Protocol Stacks>

3GPP has been working at the next release for the 5th generation cellular technology, simply called 5G, including the development of a new radio (NR) access technology operating in frequencies ranging up to 100 GHz. The first version of 5G standard was initially delivered in late 2017, which allows proceeding to trials and commercial deployments of 5G NR standard-compliant terminals, e.g., smartphones.

Figure 20:
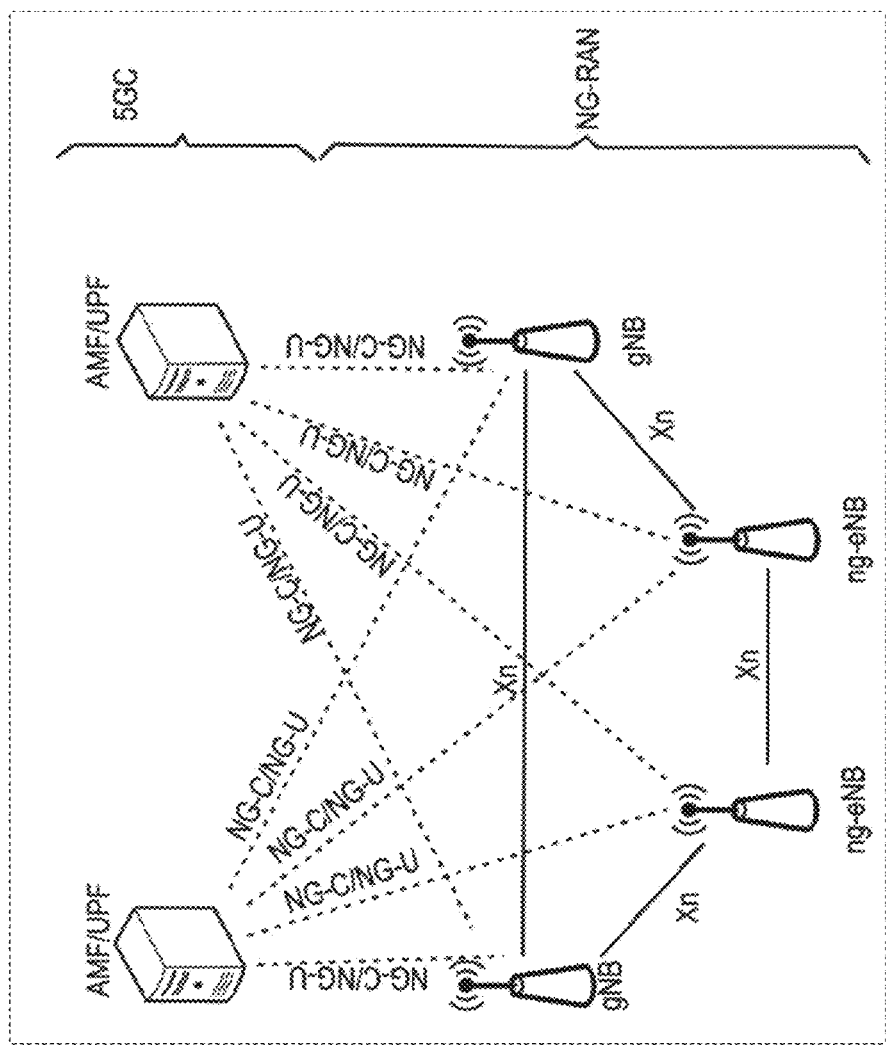
FIG. 20 is a flowchart describing exemplary operations of receiving a physical downlink shared channel (PDSCH) and transmitting a physical uplink control channel (PUCCH) by a terminal.

For example, the overall system architecture assumes a Next Generation-Radio Access Network (NG-RAN) that includes gNBs. The gNBs provide the NG-radio access user plane (SDAP/PDCP/RLC/MAC/PHY) and control plane (RRC) protocol terminations towards a UE. The gNBs are interconnected with each other via an Xn interface. The gNBs are also connected to the Next Generation Core (NGC) via the Next Generation (NG) interface, more specifically to the Access and Mobility Management Function (AMF: e.g. a particular core entity performing the AMF) via the NG-C interface, and to the User Plane Function (UPF; e.g. a particular core entity performing the UPF) via the NG-U interface. The NG-RAN architecture is illustrated in FIG. 20 (see, for example, 3GPP TS 38.300 v15.6.0, section 4).

The user plane protocol stack for NR (see, for example, 3GPP TS 38.300, section 4.4.1) includes the Packet Data Convergence Protocol (PDCP, see clause 6.4 of TS 38.300) Radio Link Control (RLC, see clause 6.3 of TS 38.300) and Medium Access Control (MAC, see clause 6.2 of TS 38.300) sublayers, which are terminated in the gNB on the network side. Additionally, a new access stratum (AS) sublayer (Service Data Adaptation Protocol: SDAP) is introduced above the PDCP (see, for example, clause 6.5 of 3GPP TS 38.300). A control plane protocol stack is also defined for NR (see, for example, TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For example, the Medium-Access-Control layer handles logical-channel multiplexing, and scheduling and scheduling-related functions, including handling of different numerologies.

The physical layer (PHY) is, for example, responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For example, the physical channels include a Physical Random Access Channel (PRACH), Physical Uplink Shared Channel (PUSCH), and Physical Uplink Control Channel (PUCCH) as uplink physical channels, and a Physical Downlink Shared Channel (PDSCH), Physical Downlink Control Channel (PDCCH), and Physical Broadcast Channel (PBCH) as downlink physical channels.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, the eMBB is expected to support peak data rates (20 Gbps for downlink and 10 Gbps for uplink) and user-experienced data rates in the order of three times what is offered by IMT-Advanced. Meanwhile, in a case of the URLLC, the tighter requirements are put on ultra-low latency (0.5 ms for each of UL and DL for user plane latency) and high reliability (1-10-5 within 1 ms). Finally, the mMTC may preferably require high connection density (1,00,000 devices/km2 in an urban environment), large coverage in harsh environments, and extremely long-life battery for low cost devices (15 years).

Thus, the OFDM numerology (e.g., subcarrier spacing. OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (also referred to as TTI) than an mMTC service. Furthermore, deployment scenarios with large channel delay spreads may preferably require a longer CP duration than scenarios with short delay spreads. The subcarrier spacing may be optimized accordingly to retain the similar CP overhead. NR may support more than one value of subcarrier spacing. Correspondingly, subcarrier spacing of 15 kHz, 30 kHz, 60 kHz . . . are currently considered. The symbol duration Tu and the sub-carrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR, for each numerology and carrier, a resource grid of subcarriers and OFDM symbols is defined for each of uplink and downlink. Each element in the resource grid is called a resource element and is identified based on the frequency index in the frequency domain and the symbol position in the time domain (see 3GPP TS 38.211 v15.6.0).

<5G NR Functional Split between NG-RAN and 5GC>

Figure 21:
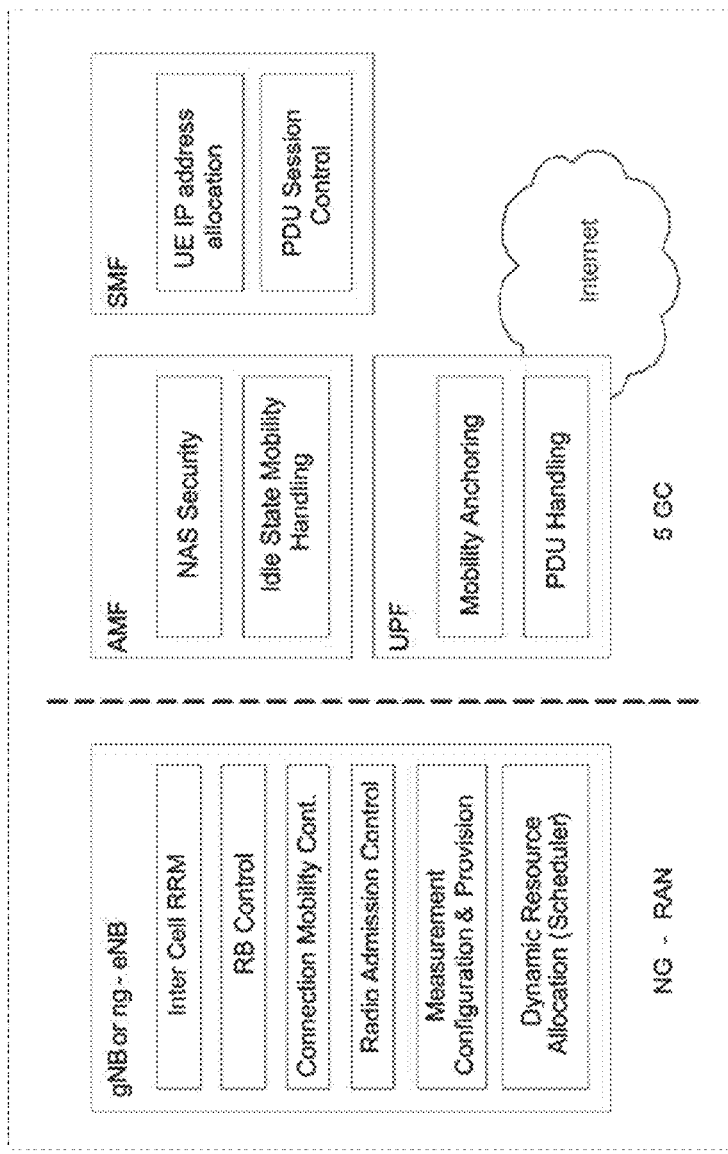
FIG. 21 is a flowchart describing an exemplary operation of transmitting a physical uplink shared channel (PUSCH) by the terminal.

FIG. 21 illustrates functional split between NG-RAN and 5GC. An NG-RAN logical node is a gNB or ng-eNB. The 5GC has logical nodes AMF, UPF, and SMF.

For example, the gNB and ng-eNB host the following main functions:

Functions for radio resource management such as radio bearer control, radio admission control, connection mobility control, dynamic allocation of resources to UEs in both uplink and downlink (scheduling);

IP header compression, encryption, and integrity protection of data;

Selection of an AMF at UE attachment when no routing to an AMF can be determined from the information provided by the UE;
Routing of user plane data towards UPF(s);
Routing of control plane information towards AMF;
Connection setup and release;
Scheduling and transmission of paging messages;
Scheduling and transmission of system broadcast information (originated from the AMF or Operation. Admission. Maintenance (OAM));
Measurement and measurement reporting configuration for mobility and scheduling;
Transport level packet marking in the uplink;
Session management;
Support of network slicing;
QoS Flow management and mapping to data radio bearers;
Support of UEs in RRC_INACTIVE state;
Distribution function for NAS messages;
Radio access network sharing;
Dual Connectivity; and
Tight interworking between NR and E-UTRA.

The access and mobility management function (AMF) hosts the following main functions:

Non-Access Stratum (NAS) signaling termination function;
NAS signaling security;
Access Stratum (AS) security control;
Inter Core Network (CN) node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing; and
Session Management Function (SMF) selection.

Furthermore, the user plane function (UPF) hosts the following main functions:

Anchor point for intra-/inter-RAT mobility (when applicable);
External protocol data unit (PDU) session point of interconnect to a data network;
Packet routing and forwarding;
Packet inspection and user plane part of policy rule enforcement;
Traffic usage reporting;
Uplink classifier to support routing traffic flows to a data network;
Branching point to support multi-homed PDU session;
QoS handling for user plane (e.g. packet filtering, gating, and UL/DL rate enforcement);
Uplink traffic verification (SDF to QoS flow mapping); and
Downlink packet buffering and downlink data indication triggering.

Finally, the session management function (SMF) hosts the following main functions:

Session management;
UE IP address allocation and management;
Selection and control of UPF;
Configuration function of traffic steering at a user plane function (UPF) to route traffic to proper destination;
Control part of policy enforcement and QoS; and
Downlink data indication.

<RRC Connection Setup and Reconfiguration Procedures>

Figure 22:
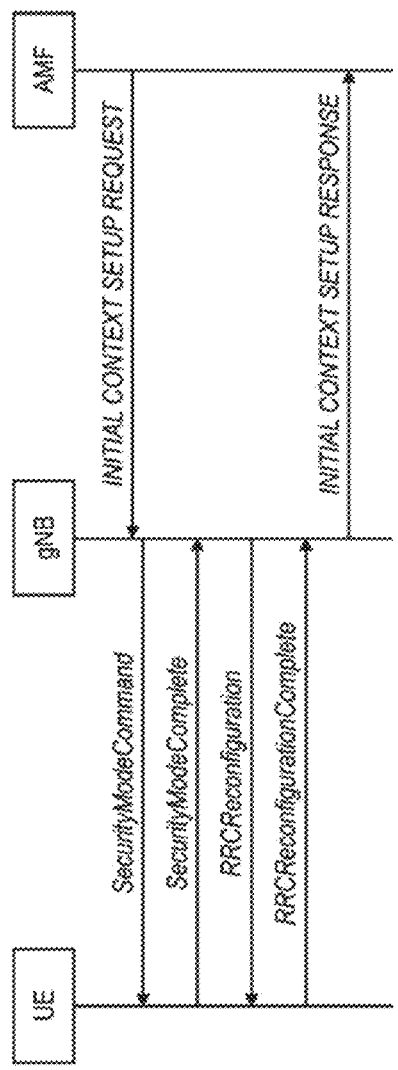
FIG. 22 illustrates an exemplary architecture for a 3GPP NR system.

FIG. 22 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. This transition involves that the AMF prepares the UE context data (including, for example, PDU session context, security key, UE radio capability, and UE security capabilities, etc.) and transmits the UE context data to the gNB with an INITIAL CONTEXT SETUP REQUEST Then, the gNB activates the AS security with the UE, which is performed by the gNB transmitting a SecurityModeCommand message to the UE and by the UE responding to the gNB with a SecurityModeComplete message. Afterwards, the gNB performs the reconfiguration to set up the Signaling Radio Bearer 2 (SRB2) and Data Radio Bearer(s) (DRB(s)) by transmitting an RRCReconfiguration message to the UE and, in response, receiving an RRCReconfigurationComplete from the UE. For a signaling-only connection, the steps relating to the RRCReconfiguration are skipped since the SRB2 and DRBs are not setup. Finally, the gNB indicates to the AMF that the setup procedure is completed with an INITIAL CONTEXT SETUP RESPONSE.

In the present disclosure, thus, an entity (e.g., AMF, SMF, etc.) of the 5th Generation Core (5GC) is provided that includes control circuitry, which, in operation, establishes a Next Generation (NG) connection with a gNodeB, and a transmitter, which in operation, transmits an initial context setup message, via the NG connection, to the gNodeB to cause a signaling radio bearer setup between the gNodeB and user equipment (UE). In particular, the gNodeB transmits a radio resource control (RRC) signaling containing a resource allocation configuration information element (IE) to the UE via the signaling radio bearer. The UE then performs an uplink transmission or a downlink reception based on the resource allocation configuration.

<Usage Scenarios of IMT for 2020 and Beyond>

Figure 23:
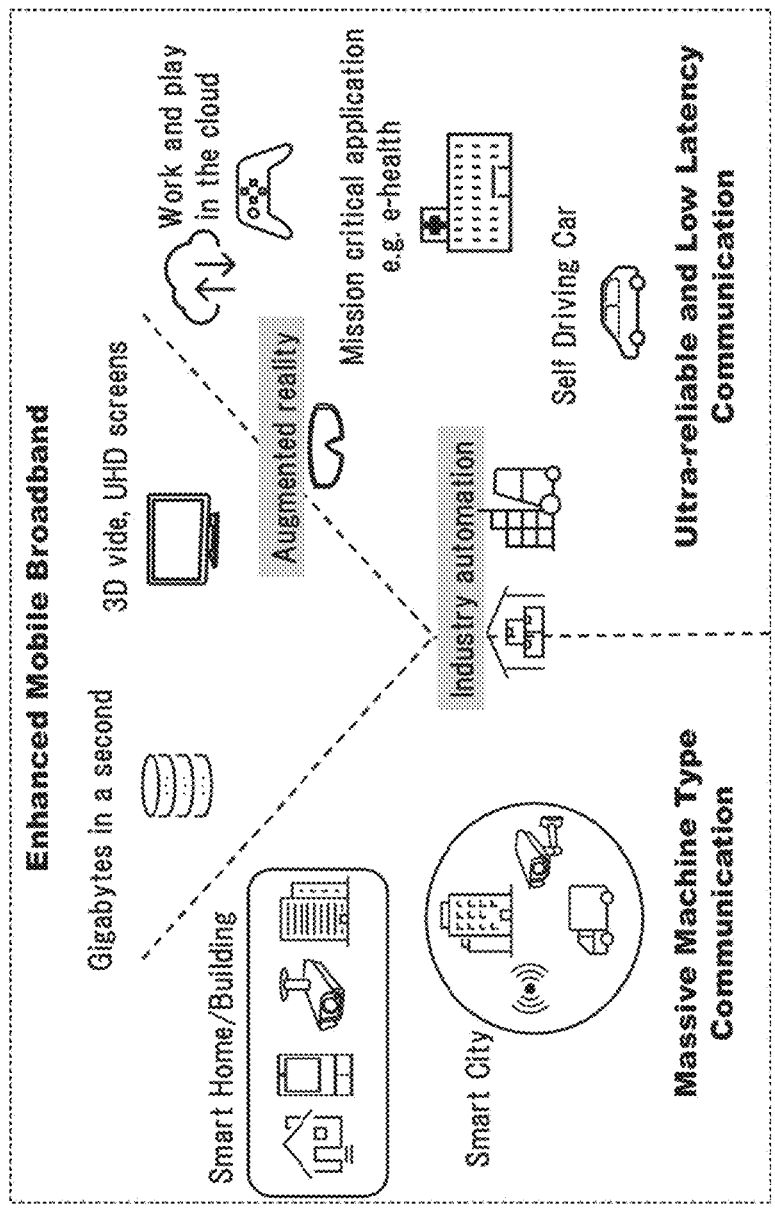
FIG. 23 is a schematic diagram illustrating a functional split between NG-RAN and 5GC.

FIG. 23 illustrates some of the use cases for 5G NR. In the 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 23 illustrates some examples of envisioned usage scenarios for IMT for 2020 and beyond (see, for example, ITU-R M. 2083 FIG. 21).

The URLLC use case has stringent requirements for capabilities such as throughput, latency, and availability. The URLLC use case has been envisioned as one of element techniques to enable future vertical applications such as wireless control of industrial manufacturing or production processes, remote medical surgery, distribution automation in a smart grid, transportation safety, etc. Ultra-reliability for the URLLC is to be supported by identifying the techniques to meet the requirements set by TR 38.913. For NR URLLC in Release 15, key requirements include a target user plane latency of 0.5 ms for uplink (UL) and 0.5 ms for downlink (DL). The general URLLC requirement for one transmission of a packet is a block error rate (BLER) of IE-5 for a packet size of 32 bytes with a user plane latency of 1 ms.

From the physical layer perspective, reliability can be improved in a number of possible ways. The current scope for improving the reliability involves defining separate CQI tables for the URLLC, more compact DCI formats, repetition of PDCCH, etc. However, the scope may widen for achieving ultra-reliability as the NR becomes more stable and developed (for NR URLLC key requirements). Particular use cases of NR URLLC in Release 15 include augmented reality/virtual reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. The pre-emption means that a transmission for which resources have already been allocated is stopped, and the already allocated resources are used for another transmission that has been requested later but has lower latency/higher priority requirements. Accordingly, the already granted transmission is replaced with a later transmission. The pre-emption is applicable independent of the particular service type. For example, a transmission for a service-type A (URLLC) may be replaced with a transmission for a service type B (such as eMBB). Technology enhancements with respect to reliability improvement include dedicated CQI/MCS tables for the target BLER of 1E-5.

The use case of the mMTC (massive machine type communication) is characterized by a very large number of connected devices typically transmitting a relatively low volume of non-delay sensitive data. Devices are required to be low cost and to have a very long battery life. From the NR perspective, utilizing very narrow bandwidth parts is one possible solution to have power saving from the UE perspective and enable the long battery life.

As mentioned above, it is expected that the scope of reliability improvement in NR becomes wider. One key requirement to all the cases, and especially necessary for the URLLC and mMTC for example, is high reliability or ultra-reliability. Several mechanisms can be considered to improve the reliability from the radio perspective and network perspective. In general, there are a few key important areas that can help improve the reliability. These areas include compact control channel information, data/control channel repetition, and diversity with respect to the frequency, time, and/or spatial domain. These areas are applicable to reliability improvement in general, regardless of particular communication scenarios.

For NR URLLC, further use cases with tighter requirements have been considered such as factory automation, transport industry, and electrical power distribution. The tighter requirements are higher reliability (up to 10-6 level), higher availability, packet size of up to 256 bytes, time synchronization down to the order of a few μs where the value can be one or a few μs depending on frequency range and short latency in the order of 0.5 to 1 ms (e.g., target user plane latency of 0.5 ms) depending on the use cases.

Moreover, for NR URLLC, several technology enhancements from the physical layer perspective have been identified. These technology enhancements include Physical Downlink Control Channel (PDCCH) enhancements related to compact DCI, PDCCH repetition, and increased PDCCH monitoring. In addition, Uplink Control Information (UCI) enhancements are related to enhanced Hybrid Automatic Repeat Request (HARQ) and CSI feedback enhancements.

Also, PUSCH enhancements related to mini-slot level hopping and retransmission/repetition enhancements have been identified. The term "mini-slot" refers to a transmission time interval (TTI) including a smaller number of symbols than a slot (a slot includes fourteen symbols).

<QoS Control>

The 5G Quality of Service (QoS) model is based on QoS flows and supports both QoS flows that require guaranteed flow bit rate (GBR QoS flows) and QoS flows that do not require guaranteed flow bit rate (non-GBR QoS Flows). At the NAS level, the QoS flow is thus the finest granularity of QoS differentiation in a PDU session. A QoS flow is identified within a PDU session by a QoS flow ID (QFI) carried in an encapsulation header over the NG-U interface.

For each UE, the 5GC establishes one or more PDU sessions. For each UE, the NG-RAN establishes at least one Data Radio Bearer (DRB) together with the PDU session, for example as illustrated above with reference to FIG. 22. Additional DRB(s) for QoS flow(s) of that PDU session can be subsequently configured (it is up to NG-RAN when to do so). The NG-RAN maps packets belonging to different PDU sessions to different DRBs. NAS level packet filters in the UE and 5GC associate UL and DL packets with QoS flows, whereas AS-level mapping rules in the UE and in the NG-RAN associate UL and DL QoS flows with DRBs.

Figure 24:
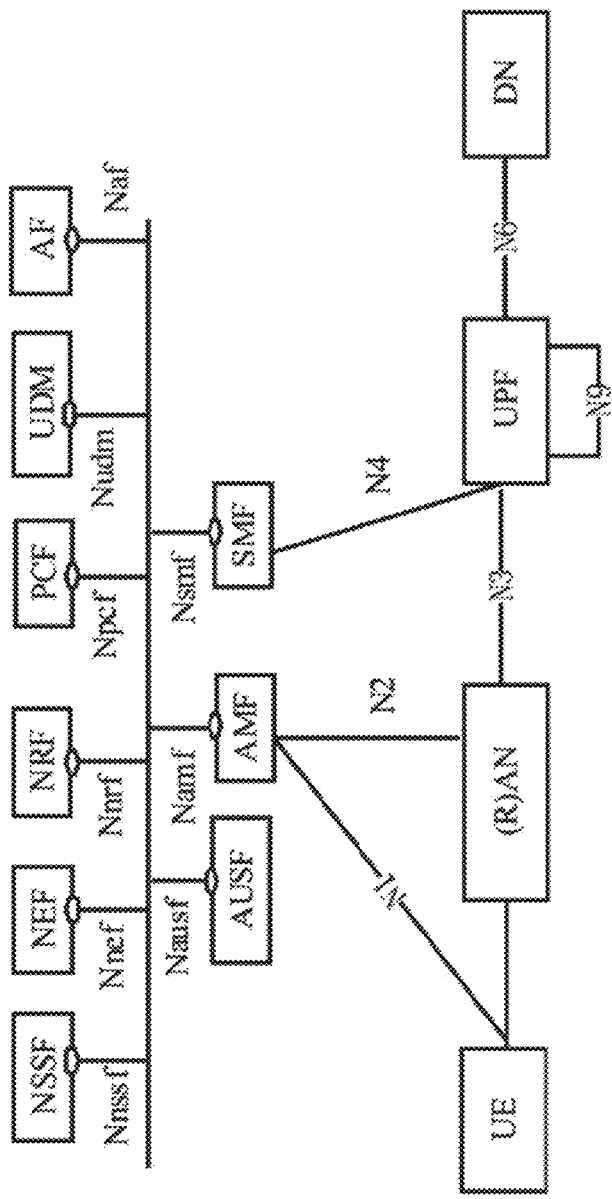
FIG. 24 is a sequence diagram for radio resource control (RRC) connection setup/reconfiguration procedures.

FIG. 24 illustrates a 5G NR non-roaming reference architecture (see TS 23.501 v16.1.0, section 4.23). An Application Function (AF), e.g. an external application server hosting 5G services exemplified in FIG. 23, interacts with the 3GPP core network in order to provide services, for example, to support application influence on traffic routing, accessing a Network Exposure Function (NEF) or interacting with the policy framework for policy control (see Policy Control Function, PCF), e.g. QoS control. Based on operator deployment, application functions considered to be trusted by the operator can be allowed to interact directly with relevant network functions. Application functions not allowed by the operator to access directly the network functions use the external exposure framework via the NEF to interact with relevant network functions.

FIG. 24 illustrates further functional units of the 5G architecture, namely a Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g. operator services, Internet access, or 3rd party services. All of or a part of the core network functions and the application services may be deployed and running on cloud computing environments.

In the present disclosure, thus, an application server (for example, AF of the 5G architecture), is provided that includes a transmitter, which in operation, transmits a request containing a QoS requirement for at least one of the URLLC, eMMB, and mMTC services to at least one of functions (for example NEF, AMF, SMF, PCF, UPF, etc) of the 5GC to establish a PDU session including a radio bearer between a gNodeB and a UE in accordance with the QoS requirement, and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. The technique of implementing an integrated circuit is not limited to the LSI, however, and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A mobile station according to an embodiment of the present disclosure includes: control circuitry, which, in operation, determines a resource based on information on a plurality of second time resources including a first time resource configured for a first type mobile station, the resource being used for repetition to a second type mobile station, and reception circuitry, which, in operation, receives a signal in the resource.

In an embodiment of the present disclosure, the plurality of second time resources include the first time resource configured for each of a plurality of radio frames.

In an embodiment of the present disclosure, the plurality of second time resources include a first unit time period where the first time resource is configured and a second unit time period that follows the first unit time period.

In an embodiment of the present disclosure, the plurality of second time resources include a first unit time period where the first time resource is configured and a second unit time period that is present earlier than the first unit time period.

In an embodiment of the present disclosure, the plurality of second time resources include a plurality of unit time periods associated with an index of at least one synchronization signal/physical broadcast channel block (SSB) among a plurality of SSBs respectively transmitted by different beams.

In an embodiment of the present disclosure, the second type mobile station includes a threshold number of antennas or less.

In an embodiment of the present disclosure, the signal is a signal shared with a plurality of mobile stations including the first type mobile station and the second type mobile station.

In an embodiment of the present disclosure, the signal is at least one of a control signal and/or a data signal whose allocation is indicated by the control signal.

In an embodiment of the present disclosure, the signal includes at least a data signal, and the plurality of second time resources are configured to be a first unit time period where the first time resource is configured and a second unit time period resulting from adding an offset to the first unit time period, the first time resource being a resource where a control signal indicating allocation of the data signal is transmitted.

In an embodiment of the present disclosure, the signal includes a control signal and a data signal whose allocation is indicated by the control signal, and in the plurality of second time resources, the reception circuitry receives the control signal in at least one time resource and receives the data signal in the at least one time resource or in a time resource after the at least one time resource.

In an embodiment of the present disclosure, the information on the plurality of second time resources is predefined, preconfigured to the mobile station, or indicated from a base station to the mobile station.

A base station according to an embodiment of the present disclosure includes: control circuitry, which, in operation, determines a resource based on information on a plurality of second time resources including a first time resource configured for a first type mobile station, the resource being used for repetition to a second type mobile station: and transmission circuitry, which, in operation, transmits a signal in the resource.

In a reception method according to an embodiment of the present disclosure, a mobile station determines a resource based on information on a plurality of second time resources including a first time resource configured for a first type mobile station, the resource being used for repetition to a second type mobile station, and receives a signal in the resource.

In a transmission method according to an embodiment of the present disclosure, a base station determines a resource based on information on a plurality of second time resources including a first time resource configured for a first type mobile station, the resource being used for repetition to a second type mobile station, and transmits a signal in the resource.

The disclosure of Japanese Patent Application No. 20204074118, filed on Apr. 17, 2020, including the specification, drawings and abstract, is incorporated herein by reference in its entirety.

INDUSTRIAL APPLICABILITY

An exemplary embodiment of the present disclosure is useful for mobile communication systems.

REFERENCE SIGNS LIST

100 Base station
101, 207 Controller
102 DCI generator
103 Higher layer signaling generator
104, 208 Encoder/Modulator
105 Signal mapper
106, 209 Transmitter
107, 201 Antenna
108, 202 Receiver
109, 205 Demodulator/decoder
200 Mobile station
203 Signal separator
204 DCI receiver
206 Higher layer signaling receiver

The invention claimed is:

1. A mobile station, comprising:
control circuitry, which, in operation, determines a resource based on information on a plurality of second time resources including a first time resource configured for a first type mobile station, the resource being used for repetition to a second type mobile station; and
reception circuitry, which, in operation, receives a signal in the resource.

2. The mobile station according to claim 1, wherein the plurality of second time resources include the first time resource configured for each of a plurality of radio frames.

3. The mobile station according to claim 1, wherein the plurality of second time resources include a first unit time period where the first time resource is configured and a second unit time period that follows the first unit time period.

4. The mobile station according to claim 1, wherein the plurality of second time resources include a first unit time period where the first time resource is configured and a second unit time period that is present earlier than the first unit time period.

5. The mobile station according to claim 1, wherein the plurality of second time resources include a plurality of unit time periods associated with an index of at least one synchronization signal/physical broadcast channel block (SSB) among a plurality of SSBs respectively transmitted by different beams.

6. The mobile station according to claim 1, wherein the second type mobile station includes a threshold number of antennas or less.

7. The mobile station according to claim 1, wherein the signal is a signal shared with a plurality of mobile stations including the first type mobile station and the second type mobile station.

8. The mobile station according to claim 1, wherein the signal is at least one of a control signal and/or a data signal whose allocation is indicated by the control signal.

9. The mobile station according to claim 1, wherein,
the signal includes at least a data signal, and
the plurality of second time resources include a first unit time period where the first time resource is configured and a second unit time period resulting from adding an offset to the first unit time period, the first time resource being a resource where a control signal indicating allocation of the data signal is transmitted.

10. The mobile station according to claim 1, wherein,
the signal includes a control signal and a data signal whose allocation is indicated by the control signal, and
in the plurality of second time resources, the reception circuitry receives the control signal in at least one time resource and receives the data signal in the at least one time resource or in a time resource after the at least one time resource.

11. The mobile station according to claim 1, wherein the information on the plurality of second time resources is predefined, preconfigured to the mobile station, or indicated from a base station to the mobile station.

12. A base station, comprising:
control circuitry, which, in operation, determines a resource based on information on a plurality of second time resources including a first time resource configured for a first type mobile station, the resource being used for repetition to a second type mobile station; and
transmission circuitry, which, in operation, transmits a signal in the resource.

13. A reception method, comprising:
determining, by a mobile station, a resource based on information on a plurality of second time resources including a first time resource configured for a first type mobile station, the resource being used for repetition to a second type mobile station; and
receiving, by the mobile station, a signal in the resource.

14. A transmission method, comprising:
determining, by a base station, a resource based on information on a plurality of second time resources including a first time resource configured for a first type mobile station, the resource being used for repetition to a second type mobile station; and
transmitting, by the base station, a signal in the resource.

* * * * *